(12) United States Patent
Mortsolf et al.

(10) Patent No.: US 11,012,320 B2
(45) Date of Patent: May 18, 2021

(54) INTERACTIVE GRAPHICAL MODEL-BASED MONITORING AND CONTROL OF NETWORKED PHYSICAL ASSETS

(71) Applicant: OasisWorks Inc., Billerica, MA (US)

(72) Inventors: Timothy Mortsolf, Amherst, MA (US); Scott Myelle, Harvard, MA (US); Kevin Cramer, Kirkland, WA (US); Anil Gunturu, Lexington, MA (US)

(73) Assignee: OasisWorks Inc., Billerica, MA (US)

( * ) Notice: Subject to any disclaimer, the term of this patent is extended or adjusted under 35 U.S.C. 154(b) by 0 days.

(21) Appl. No.: 16/697,905

(22) Filed: Nov. 27, 2019

(65) Prior Publication Data

US 2020/0274773 A1  Aug. 27, 2020

Related U.S. Application Data

(60) Provisional application No. 62/810,655, filed on Feb. 26, 2019.

(51) Int. Cl.
*H04L 12/24* (2006.01)
*G05B 15/02* (2006.01)
*G06F 3/0481* (2013.01)

(52) U.S. Cl.
CPC ............. *H04L 41/22* (2013.01); *G05B 15/02* (2013.01); *G06F 3/04815* (2013.01)

(58) Field of Classification Search
CPC ...... H04L 41/22; H04L 43/08; G06F 3/04815; G05B 15/02
See application file for complete search history.

(56) References Cited

U.S. PATENT DOCUMENTS

| | | | | |
|---|---|---|---|---|
| 10,009,232 B2 * | 6/2018 | Duncan | ............ | G06F 3/0482 |
| 2016/0270740 A1 * | 9/2016 | Raisoni | ............ | A61B 5/1459 |
| 2016/0380844 A1 * | 12/2016 | Duncan | ............ | G06F 11/30 715/736 |

FOREIGN PATENT DOCUMENTS

WO   WO-2007033005 A2 *   3/2007   ............ G07F 17/32

\* cited by examiner

*Primary Examiner* — Michael C Lai
(74) *Attorney, Agent, or Firm* — Intrinsic Law Corp.

(57) ABSTRACT

A system and method are disclosed for gathering information relating to a system being monitored, modeling various aspects of the system to present it on a useful console, and further for controlling the system using a monitoring and control interface. In an aspect the system and method employ combinations of graphics architectures, including advanced video gaming technology and methods in previously-unknown configurations, to achieve an effective monitoring and control architecture.

9 Claims, 17 Drawing Sheets

INTERACTIVE GRAPHICAL MODEL-BASED MONITORING AND CONTROL OF NETWORKED PHYSICAL ASSETS

CROSS-REFERENCE TO RELATED APPLICATIONS

This application claims the benefit and priority of U.S. Provisional patent application Ser. No. 62/810,655 filed Feb. 26, 2019, entitled INTERACTIVE GRAPHICAL MODEL-BASED MONITORING AND CONTROL OF A NETWORKED SYSTEM, which is hereby incorporated by reference.

TECHNICAL FIELD

The present application relates to monitoring, displaying and interactively controlling a system using advanced graphics methods and hardware.

BACKGROUND

It is necessary or desirable that operators of complicated systems be able to see and monitor the condition of their systems. Examples abound and would be too far-reaching to enumerate, however, some contexts in which a complicated distributed system calls for observation, telemetry and monitoring include traffic, utilities, data storage systems, financial systems, inventory controls, military applications, space and undersea systems, communication networks, and others. Since large, complex, or distributed systems like these are challenging to monitor directly by traveling to and observing the state of various components of the system at once, centralized observation systems and dashboards.

Existing methods and systems can also allow centralized control or actuation of system components by a human or automated operator, including based on observations, measurements or other data reports regarding the state of the system. By way of example, using a modern central command and control system, a handful of human operators can monitor and control a large industrial complex such as a power plant or other semi-automated industrial site. Visual indicators can represent certain conditions of the power plant to operators in a control room (or any remote location) either using direct connections to gauges and sensors installed in the plant, or on a computer-display screen. Out-of-band measurements can be indicated using a variety of visual and/or audible alarms. The status of various equipment, valves and machines can be likewise indicated to the operators. The operators can respond to the indicated conditions of the plant by remotely operating component machinery such as by remotely opening or shutting valves, starting or stopping pumps, and so on. All of this can be achieved from the operators' control station using suitable user interface elements such as push-buttons, relays, computer-controlled actuators, and other means.

In another example, human and/or processor-controlled operators can monitor and operate a communications network spanning thousands of physical miles. Using a suitable programmed interface, the operators and/or control systems are able to adjust network load, secure and open channels, bring servers on or off line, and otherwise optimize operating conditions in the network.

FIG. 1 illustrates a networked system 10 comprising a plurality of assets 110 (e.g., machinery or components coupled to network 100). Each asset 110 may be coupled to network 100 by a communication interface, local controller or switch 105 that communicates data between asset 110 and network 100. The extremities of the networked system 10 may comprise hardware, firmware or software that can be designed and configured according to an applicable protocol relating to the application at hand.

A computer 120 may be also coupled to the network 100, e.g., using a network communication bus or card that sends and receives data according to a communication protocol. The computer 120 may comprise or be a client processor or computing machine having a user interface 122 and including a display screen 124 for displaying a variety of system conditions, measurements, or other data. The interface 122 and display 124 can be used to allow an operator 140 to monitor and/or control aspects of system 10. Conventional user interfaces and controls can include a keyboard, mouse, touch screen, or similar implements.

As mentioned above, the operator 140 can see a condition of interest in the system and take corrective action, e.g., taking an asset online or offline by entering a suitable input to interface 122. The interface 122, through computer 120 may send a corresponding control signal over network 100 to a controller or switch 120 that can affect a change to its respective asset 110.

While current monitoring and control systems include graphical user interfaces (GUI) that allow the representation of various data on a computer screen or similar displays, and basic controls, existing systems are still limited. The range of operations possible with current systems is growing but remains limited due to technical factors, bandwidth, cost, and the limitations of human ingenuity.

In some situations, poor user interfaces, unclear status reports, and slow or sub-optimal controls can result in damage or injuries if equipment and assets are incorrectly operated. For example, in a transportation environment (e.g., rail or air traffic controls) disastrous consequences can occur by improper monitoring and control of such automated systems. Similarly, in military, industrial, power plant utilities, communication systems, financial data systems, or other contexts, poorly designed or operated automation and controls can result in significant failures and losses.

Today's automation solution stacks are typically comprised of several tools targeted at very specific functions at specific layers in a solution stack and are integrated together by hand by skilled Dev-Ops staff or expensive systems integrators. Exacerbating this complexity, the proliferation of open source software in this space requires the kind of build, bundle and packaging capabilities usually only found within software development firms. Almost all of today's automation solution stacks are designed to operate in a single datacenter and assume equipment colocation and direct networking adjacencies to function. Remote sites with intermittent connectivity can require local site-level installations in order to perform site-level bootstrapping, configuration, upgrades and manage an end-to-end solution offering.

Using a collection of today's automation tools is complicated. Installations typically require complicated bundle installations, package downloads from the internet with little-to-no version controls and minimal documentation. Configuring them usually requires remote connections to command lines with highly proprietary command structures requiring a user to become an expert at the structure and syntax of each tool. Integrating, deploying, configuring and operating today's automation tools at the scale of these new distributed network architectures will be near impossible.

Better monitoring and control systems are needed to enable ever-growing demands to observe and control large and complicated systems and networks including information networks. Some or all of these issues are addressed by the present invention.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One or more aspects are directed to a method for remotely monitoring and controlling physical assets, comprising defining a dataset corresponding to a plurality of data-connected assets coupled to a data network, wherein each asset is associated with a respective feature set of the asset that can be monitored and controlled over said network using respective monitoring and control signals; encoding said dataset in a data store coupled to said network; serving said dataset to one or more consoles coupled to said network; using a console graphics processing unit (GPU), generating a model-based three-dimensional vector graphics representation of said one or more assets, along with respective states of said assets, based on respective data in said dataset; on a console display screen, displaying the model-based three-dimensional vector graphics representation of said asset, including displaying a state of one or more controllable features of said asset; using said console GPU, executing an interface abstraction layer to generate one or more model-based graphical user interface tools corresponding to the one or more controllable features of said asset; on said console display screen, displaying a vector graphic representation of the one or more user interface tools so as to present an interactive control interface including said one or more user interface tools to a user of the console; using said interactive control interface, accepting an input through said one or more user interface tools, each input corresponding to a respective controllable feature of said asset; sending one or more control signals from said console to an asset controller, over said communication network, so as to configure one or more respective controllable features of said asset; and updating a state of the one or more controllable features of the asset in the displayed representation of the asset on said console display screen, including updating a state of said one or more controllable features of said asset as displayed on said display screen.

Yet another aspect is directed to a system for monitoring and controlling networked physical assets, comprising a computing console comprising a console processor configured and arranged to execute instructions for monitoring and controlling said physical assets, including instructions encoded into a data store of said console corresponding to a plurality of controllable features of said assets; and a graphics circuit configured and arranged to generate a graphical output onto a display screen coupled to said console, and particularly configured and arranged to execute machine-readable instructions to generate a plurality of displayable screen views onto said display screen, each of said screen views comprising a transparent background and screen coverage size and area, wherein a plurality of said screen views are simultaneously generated by said graphics circuit and presented in respective positions relative to one another on said display screen and each of said screen views presents respective information relating to one or more of the controllable features of said physical assets, and wherein each of said screen views presents one or more user-interactive controls permitting changing of the encoded data in said data store and changing of corresponding controllable features of the respective physical assets

BRIEF DESCRIPTION OF THE DRAWINGS

For a fuller understanding of the nature and advantages of the present concepts, reference is made to the following detailed description of preferred embodiments and in connection with the accompanying drawings. In the drawings, like reference characters generally refer to like features (e.g., functionally-similar and/or structurally-similar elements).

DETAILED DESCRIPTION

Figure 1:
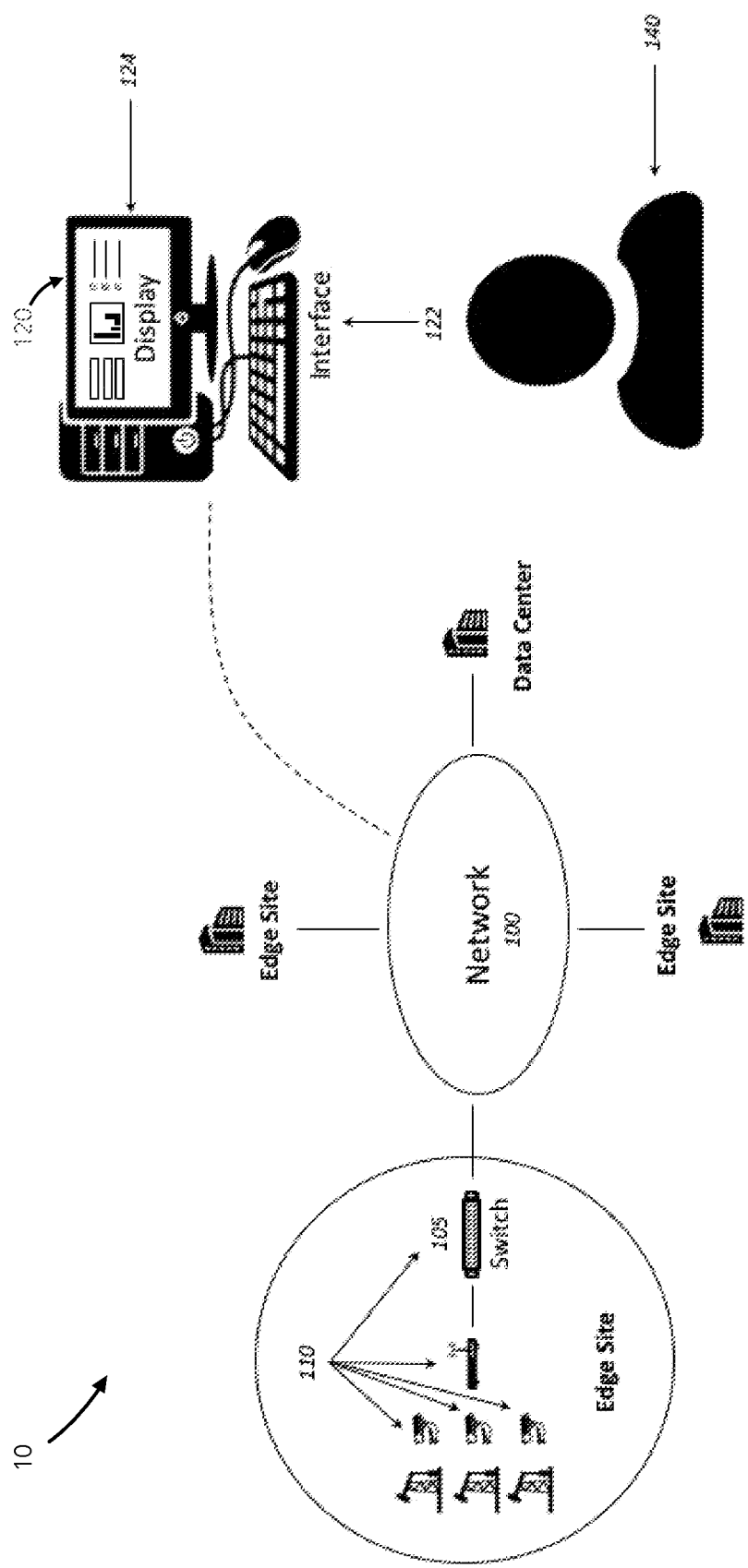
FIG. 1 illustrates a control system and panel for controlling a remote asset according to the prior art.

As mentioned above, improved monitoring and controls are desired and sometimes necessary for ever-growing complex networked systems. As an example, as 5G technologies and the Internet of Things (IoT) applications come into use, edge computing capabilities parallel their adoption, unlocking the potential for a new era of highly distributed network architectures. These new architectures are the foundation for new standardization efforts aimed at defining how edge computing resources interwork with data center and cloud resources.

One application of the present disclosure relates to so-called fog computing, used to extend cloud computing resources closer to the things that produce and act on IoT data. These devices, described as Fog Nodes, can be deployed anywhere with a network connection: on a factory floor, on top of a power pole, alongside a railway track, in a vehicle, or on an oil rig. Fog Computing accelerates awareness and response to events by eliminating a round trip to the data center or cloud for analysis. It avoids the need for costly bandwidth additions by offloading gigabytes of network traffic from the core network and can be used in scenarios where there is no connection. It also protects sensitive data by keeping it inside a company's network. Users can place security features in a Fog network, from segmented network traffic to virtual firewalls.

In another application, Multi-access Edge Computing (MEC) is a network architecture concept that enables cloud computing capabilities and an IT service environment at the edge of a mobile network. Like Fog, the basic idea behind MEC is that by running applications and performing related processing tasks closer to the mobile device, network congestion is reduced, and applications perform better. MEC technology is designed to be implemented at mobile base stations and enables flexible and rapid deployment of new applications and services for customers. Combining elements of cloud and networking, MEC allows mobile operators to open their radio access network (RAN) to authorized third-parties, such as application developers and content providers. It uniquely allows software applications to tap into local content and real-time information about local access network conditions. By deploying various services and caching content at the network edge, mobile core networks are alleviated of further congestion and can efficiently serve local purposes.

Yet another application of the present disclosure is in the context of Central Office Re-architected as a Datacenter (CORD) combines the concept of Network Function Virtualization (NFV), Software Defined Networking (SDN), and the elasticity of commodity clouds to bring datacenter economics and cloud agility to the Telco Central Office. CORD lets operators manage their Central Offices (COs) using declarative modeling languages for agile, real-time configuration of new customer services. Several communication and data service providers already supporting CORD. Providers can leverage a common hardware and software infrastructure to offer traditional connectivity as well as cloud services for residential, enterprise and mobile customers. CORD allows residential, mobile, and enterprise customers to configure and manage their service packages with ease and in almost real time. One can also use CORD infrastructure to allow third parties to offer innovative services to common customers in a variety of partnership models.

While these new distributed architectures deliver versatility for end-to-end solution offerings, they create a new set of challenges for equipment installation, hardware bootstrapping, software stack installation, solution configuration and operational management. Without standardization, today's automation tools present a mix of deployment, configuration and operational interfaces typically individually managed. To solve the scale-out issue of having multiple tool sets, at multiple sites, each with their own operational interface, an improved automation framework could provide individual points of integration with abstracted representations of each existing tool's capabilities as a network wide model with a common API definition.

Figure 2:
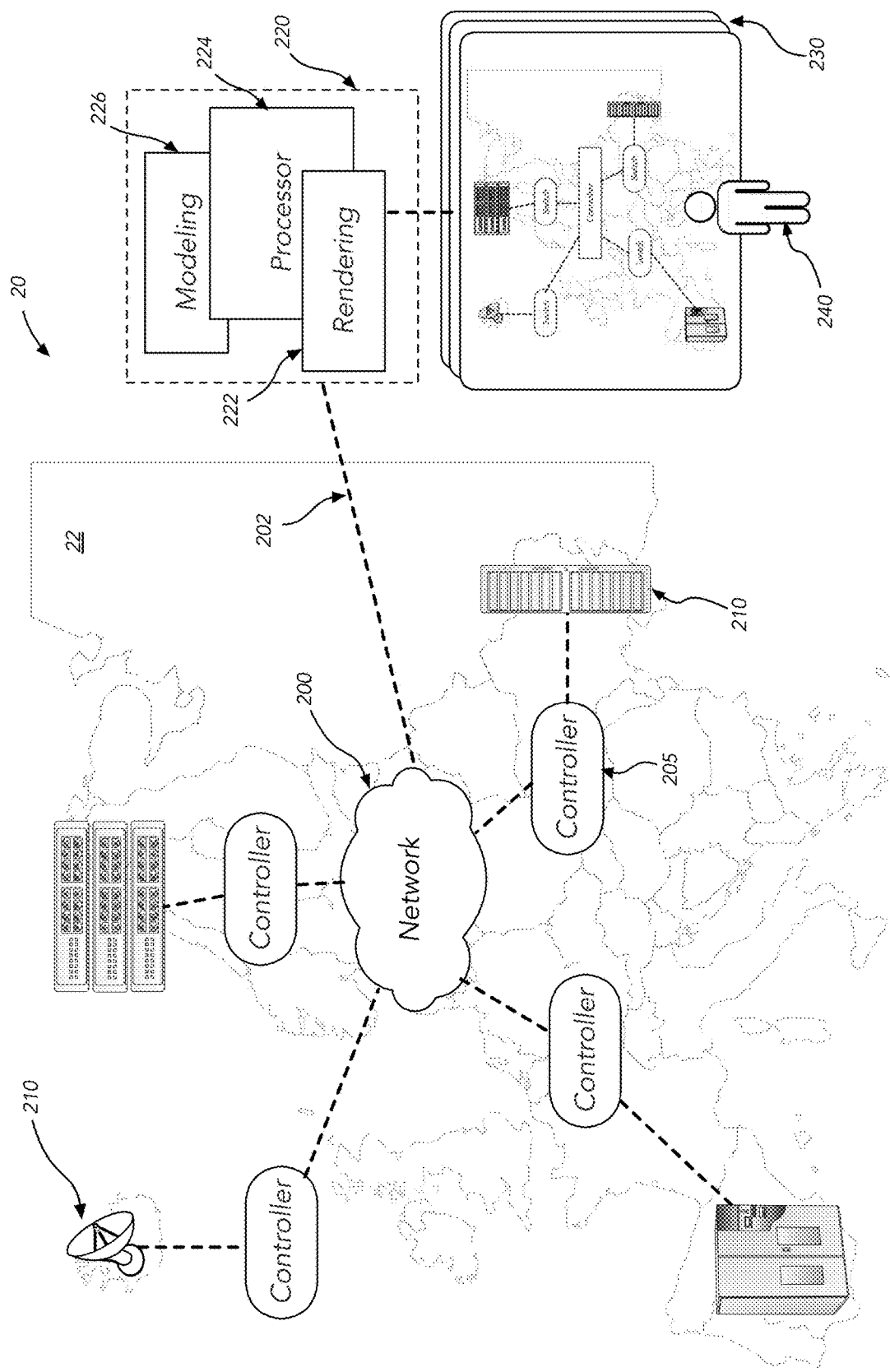
FIG. 2 illustrates an arrangement for monitoring and controlling one or more networked physical assets.

FIG. 2 illustrates a networked system 20 according to embodiments of this invention. As before, the system may have a plurality of distributed assets 210 (for example, information system assets, communications assets, hardware, software, or combinations thereof, or any other networked assets). Network 200 can include various levels of data network interconnectivity, generally represented here for simplicity, and can comprise the internet or other local and/or wide area networks or subnets, in data communication using one or more communication protocols. Assets 210 are distributed in a logical, virtual or physical domain or scene 22, which can be a mappable domain such as a network domain or a geographic domain. The position (logical and/or physical) of the individual assets 201 can be represented in or on a representation of domain. In one example, data processing assets 210 are shown or represented with respect to a domain or scene 22 comprising a map. The map can represent continents, countries, cities, or other domains down to a corporate or real estate level of representation, e.g., showing a commercial or residential facility.

A computer, computing circuit, processor-based machine, server, client, or other computing machine 220 is also coupled to network 200, for example over a local network connection or interface 202. The computer 220 comprises modeling capabilities provided by a modeling circuit and/or instruction set implemented in modeling engine 226, as well as a graphics or rendering circuit or processor and/or instruction set implemented in rendering engine 222. A general-purpose processor 224 and/or a plurality of special-purpose processors may reside in and be implemented in any suitable hardware, firmware and/or software configuration 224, and may be physically constructed or implemented in any form suiting a given purpose. In one aspect, special-purpose graphics processing circuits are used for rendering or other graphical functions as will be described below. In another aspect, specialized graphical methods or processes are implemented using rendering engine 222. The rendering engine 222 is configured, arranged, programmed and/or wired to apply machine-executable computer graphics methods, including newly-devised methods as described herein. Some such methods and in the present system employ one or more new hardware, firmware and/or software components, but may also employ existing known components, albeit in configurations and combinations that are novel and non-obvious to achieve some or all of the instant advantages, features and results.

As will be discussed further, the modeling engine 226 is configured, arranged, programmed and/or wired to apply a machine-executable model or models, including models to process model-driven geographic scenes, maps, animations, object layouts, and physical/virtual relationships between said things. The modeling engine is configured and arranged in some embodiments to execute special modeling instructions in shared or private circuitry thereof to implement models of various objects and resources of the system, e.g., based on parameters and descriptive attributes of the objects and resources.

In addition, a graphical console 230 is provided, which delivers a range of advanced monitoring and controls features to user or operator 240. The console 230 may include a display panel and/or other visual or audible indications representing one or more conditions, parameters or states of the system 20 or any assets 210 thereof. For example, the console 230 may deliver layered graphical information to operator 240 indicating utilization metrics of a data communication system 20, which may include the status of one or more servers, clients, routers, data storage units, fiber optic units, power supplies or other accessories. The information conveyed by console 230 may comprise a plurality of overlays that are logical or physical representations and may include a location or mapping layer on which the assets are represented with respect to a scene or domain 22.

An embodiment further comprises a mapping engine that operates in coordination with other components of the system 20 to obtain map data to form a displayable mapping layer for presentation to operator 240 via console 230. The mapping data can include open source map data, publicly available map data and/or proprietary map data and information associated with a map (e.g., street data, zoning data, weather data, traffic data, demographic data, financial data, and so on).

Yet another aspect allows operator 240 to interact with the system 20 or control the presentation of information on console 230 as well as to control one or more assets 210. Different visual layers of information may be turned on or off by the operator 240, changing the displayed data on demand.

Figure 3:
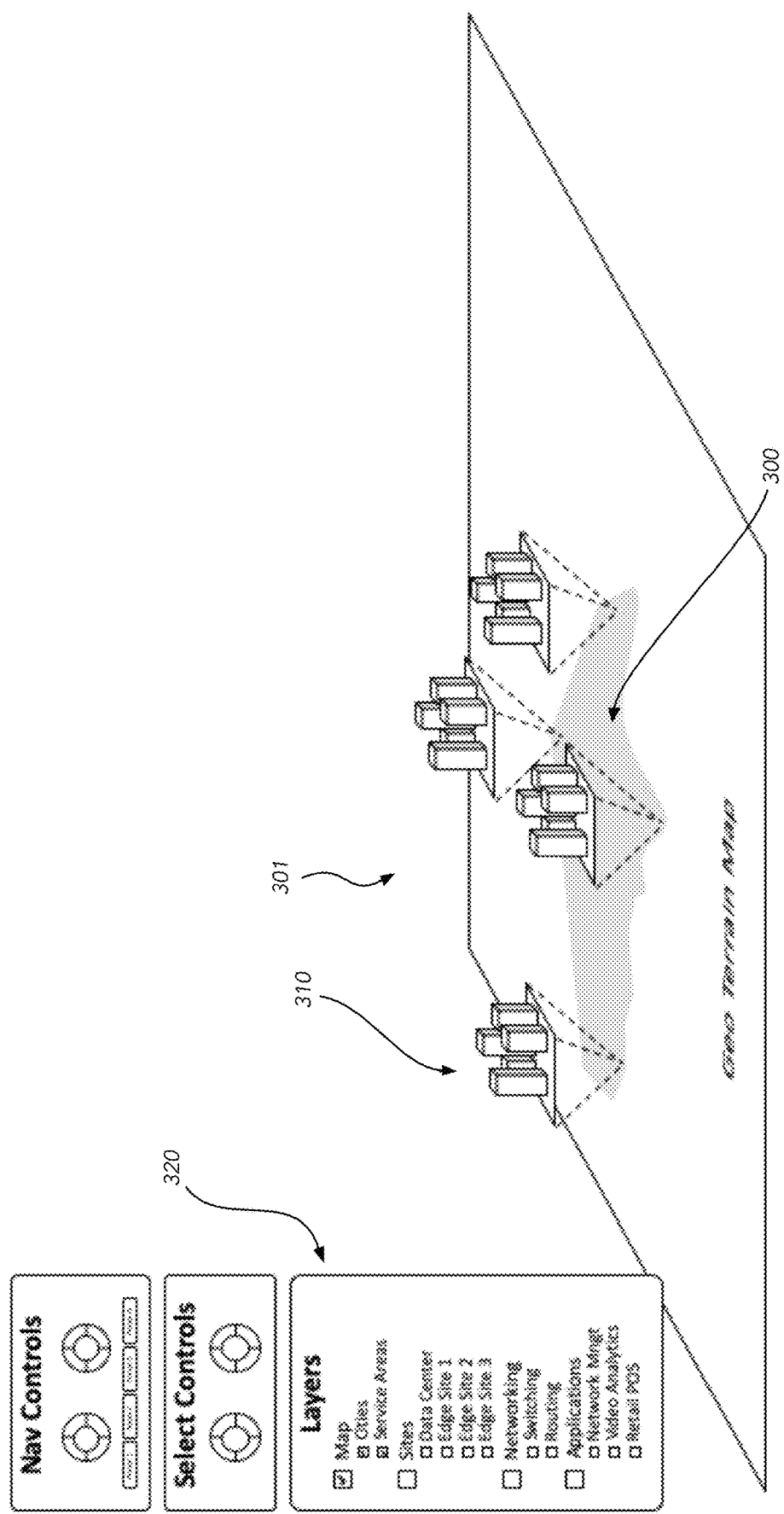
FIG. 3 illustrates an exemplary site layer.

FIG. 3 illustrates an example of model-driven maps and other interface components that can be presented on console 230. As stated, one aspect of the invention is the ability to associate objects and resources or assets with a logical or geographic map, e.g., a map of a continent, region, country, city, and so on. The maps can be managed in the present system and method in or as a map layer 301, which can be one of a plurality of layers of information and resources. The system, which is able to communicate with or exchange data through network 200 can receive map data in any suitable format. The map data can comprise graphical data, raster data, vector data, information tiles, logical or image-based data, coordinate data, or any other geographic information that enables the system to construct a map 300 from a model. In some examples, open source or publicly available information can be obtained and rendered into images that suit the present application. Therefore, two- or three-dimensional maps, exterior spaces and/or interior spaces can be depicted and associated with other layers of data or resources. As an example, FIG. 3 illustrates a geographic map 300 showing a region and can furthermore depict other information on said map or in connection with it such as relative relationships of some infrastructure resources 310 to map 300 and to each other on map layer 301. The map can be interactive or customizable on account of its model and methods and may be scalable to rapidly and smoothly show any full or partial region of interest. System controls 320 presented along with the map can be used to enable or disable resources such as resources associated with infrastructure 310. The system controls 320 can in some aspects be used to toggle the view/hide attributes of one or a class of objects and resources. The maps can represent physical and/or logical or virtual data and information as well as relationships. Various layers of information and objects are selectable by the operator or user 140 and are conveyed on a scene as appropriate.

Figure 4:
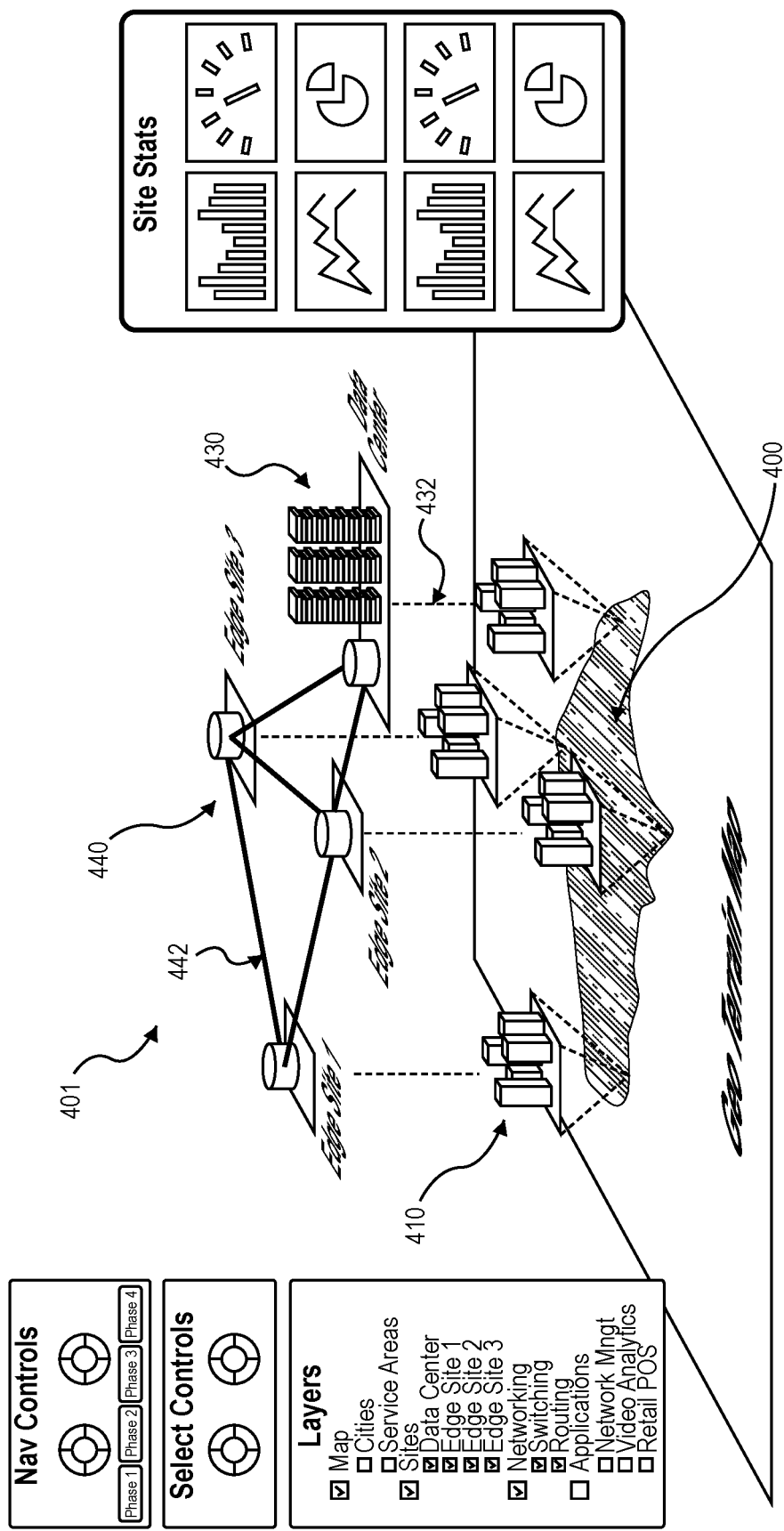
FIG. 4 illustrates an exemplary site layer.

FIG. 4 illustrates an exemplary scene that is model-driven according to this invention, and which presents a map 400 as described above. In addition, model-driven object layouts are provided in a site layer 401, for example showing various servers, routers or other networked resources 410 in connection with a location on the map 400. The site layer 401 can be represented in addition to or on top of the map layer 301 mentioned above. For example, but not by way of limitation, a country, city, neighborhood, or industrial complex or campus can be shown on the map. And, in an example, resources such as networked resources 440, data centers 430 or other resources are shown in relation to the infrastructure 410 with which they are associated, e.g., at certain locations can be shown in relation to their physical locations on the map. A scene can include street data and building height or other architectural information. In this example, the previously described map layer is shown and dotted or dashed connections 432 may be used to associate a visual connection between a given resource in the site layer 401 and its corresponding location on the map layer 301.

Logical connections, e.g., communication pathways and network branches, 442, can also be depicted and visually inter-connect the routers, which are networked resources. In one example, components (e.g., routers) coupled using a DWM private tunnel connection or network are depicted. In addition, as shown, one or more visually-illustrated stacks of software agents, resources, or data structures can be associated with their respective servers, routers or hardware resources. An operator can therefore see which resources are available at what locations and can determine what applications are installed or active on each resource. In an aspect, selection of a certain network slice determines the layers, data, information or graphical content shown on the console. In another aspect, a user or operator can set a virtual camera position using a scene dropdown menu selector or other user interface. Zooming, panning, rotating and other functions are possible, which may be implemented herein using specialized high-end gaming hardware, software and methods previously not employed in this or related fields. In a non-limiting instance, the present invention uses a forked instance of a graphics construct to render 3D objects and place assets in a 3D space. The graphics construct can be in some embodiments a javascript-based WebGL rendering software used for 3D game systems, including an open source variety thereof. In one non-limiting instance, a JSON construct is used for some or all modeling aspects, which can permit a Web browser to affect data in a database. The present system can provide model-driven object layouts, which can be shown on exterior and/or interior views of a physical or logical scene.

Figure 5:
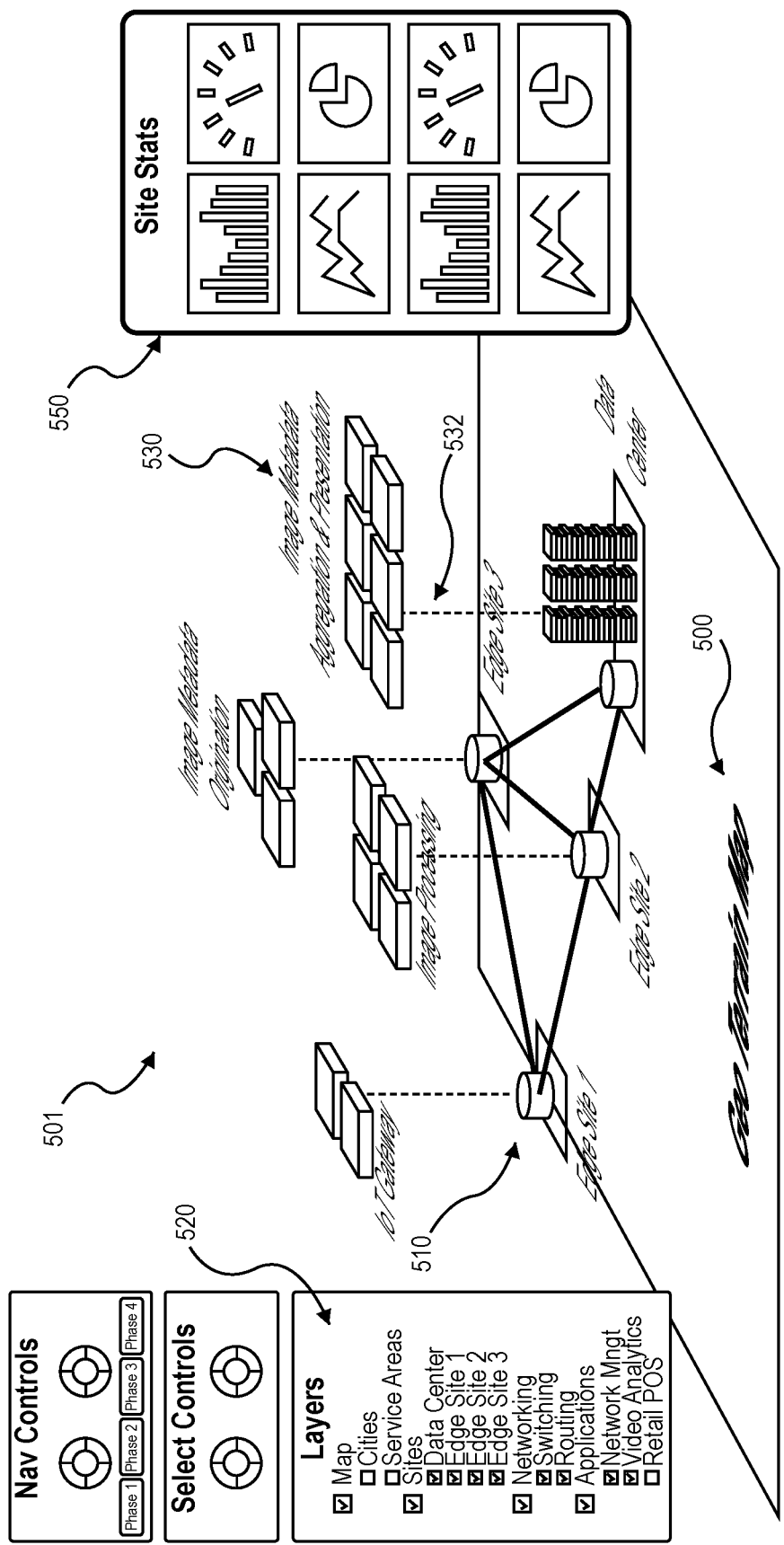
FIG. 5 illustrates an exemplary application layer.

FIG. 5 illustrates an exemplary application layer 501 of the present system and method. The application layer 501 can depict further examples of data, objects and attributes of networked resources 510 with respect to a map layer terrain map 500. The application layer 501 has a controls panel 520 accessible to the user of the console, which allows customizing the display and viewing of various things in the application layer 501 such as network analytics, video analytics, retail point of sale (POS) and other features. Application stats are displayed in some aspects in a display panel 550 dedicated for this purpose. Applications 530 may be associated with corresponding resources 510 using visual connections 532 such as dashed or dotted lines. The examples provided are not meant to be limiting but show what software applications are installed or running on the selected server assets. In an exemplary embodiment, it may be that one server is not capable of satisfying the computing needs of a given software application (for example if too many customers are being serviced by the application). In this situation, multiple servers will be employed to provide the needed application. On the other hand, sometimes one server may be more than adequate to satisfy the requirements of a software process and can in fact execute multiple software processes on one server. In this instance, a single server can be shown with a plurality of software processes or workloads running thereon. For this reason, the available servers are set out as shown on an imaginary plane in Cartesian relation. Again, this is but one option, and the present system and method comprehend a large number of other possible arrangements without loss of generality.

FIGS. 6*a*-6*d* illustrate an exemplary site view 601 and related assets and controls according to some aspects of the invention and in the context of a non-limiting IT assets example.

IT networked assets 600 are presented in a site view 601, including for example a representation of various networked computing assets 600 (e.g., many servers arranged in a plurality of server stacks or racks). These resources or assets 600 can be depicted in realistic or physically relevant form (e.g., displaying three-dimensional representations of the actual server stacks in their server racks) using the graphical processing hardware and software components and methods of the invention, or in an abstracted view such as geometric 2D or 3D primitives. The type of asset 600 can be differentiated by overlaying text thereon describing the asset (e.g., Leaf, Spine, WAN, etc.) or by differentiating the asset's color, shape, size or other visual attribute. In Photo-realistic or near-photo-realistic representations of the resources (e.g., servers) can be prepared to best aid operators in understanding and recognizing the nature and configuration of their systems in some embodiments. However, the resources can also be simplified or represented in other ways that do not physically resemble them, as desired.

In an example, the assets represent information technology (IT) assets such as computing machines, servers, etc. as previously mentioned. The assets can be arranged or grouped logically or physically. Statistics or status information can be displayed for this layer at rack stats panel 650, server group stats 652, server type stats 654 or hypervisor stats 656. Each of these stats panels provides a view of a respective set of performance data (stats) aggregated at its respective layer of the present solution. Panel 650 may provide a user with performance data aggregated for an entire rack of servers. Panel 652 may provide the user with performance data aggregated for a specific group or subset of servers. Panel 654 may provide the user with performance data aggregated across a certain type of server. Panel 656 may provide the user with performance data for a specific type of hypervisor. The layers themselves are shown or hidden using layers control panel 620.

Figure 6A:
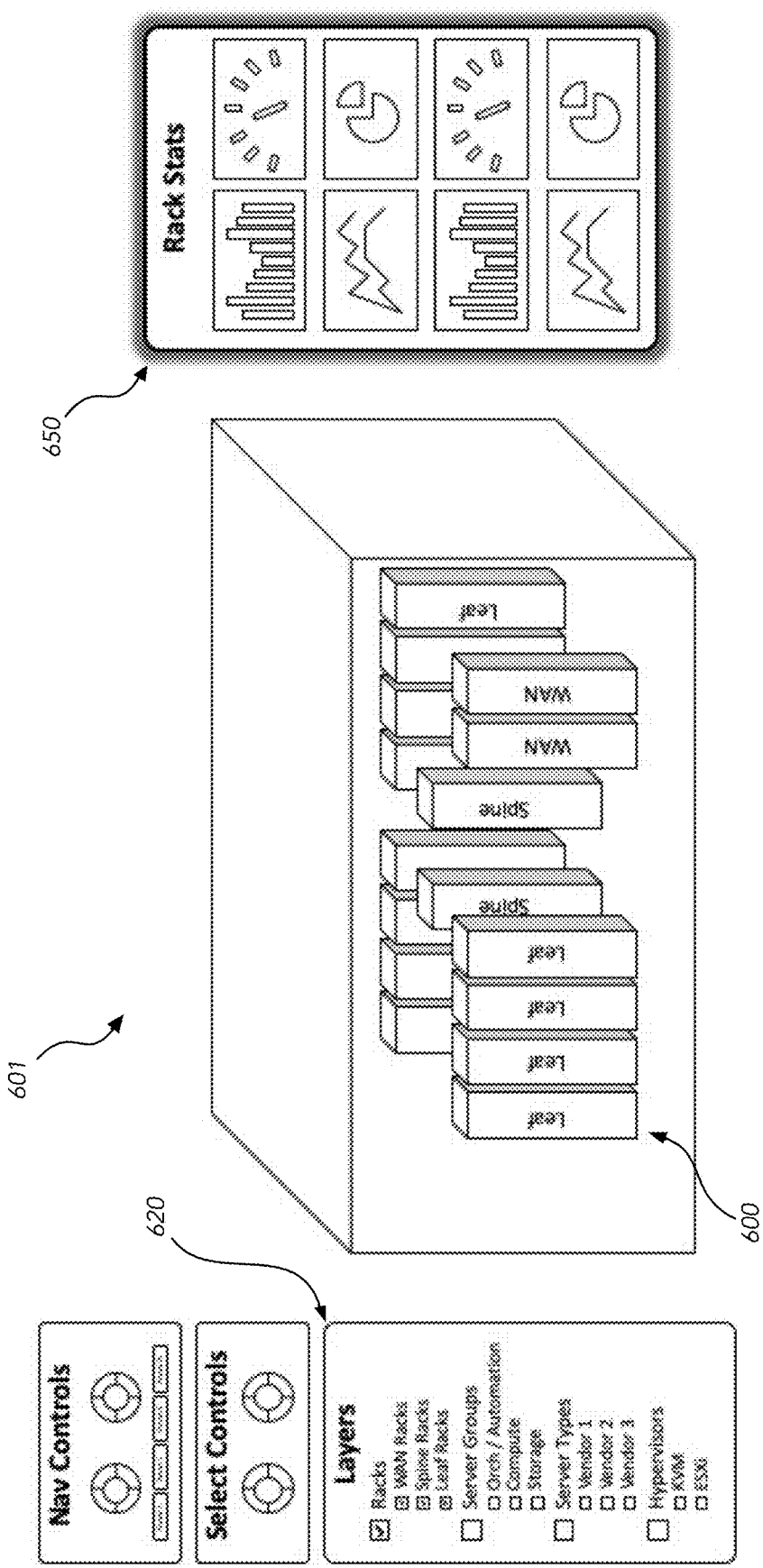
FIGS. 6a through 6d illustrate a site view and controls related to networked assets in some embodiments.
Figure 6B:
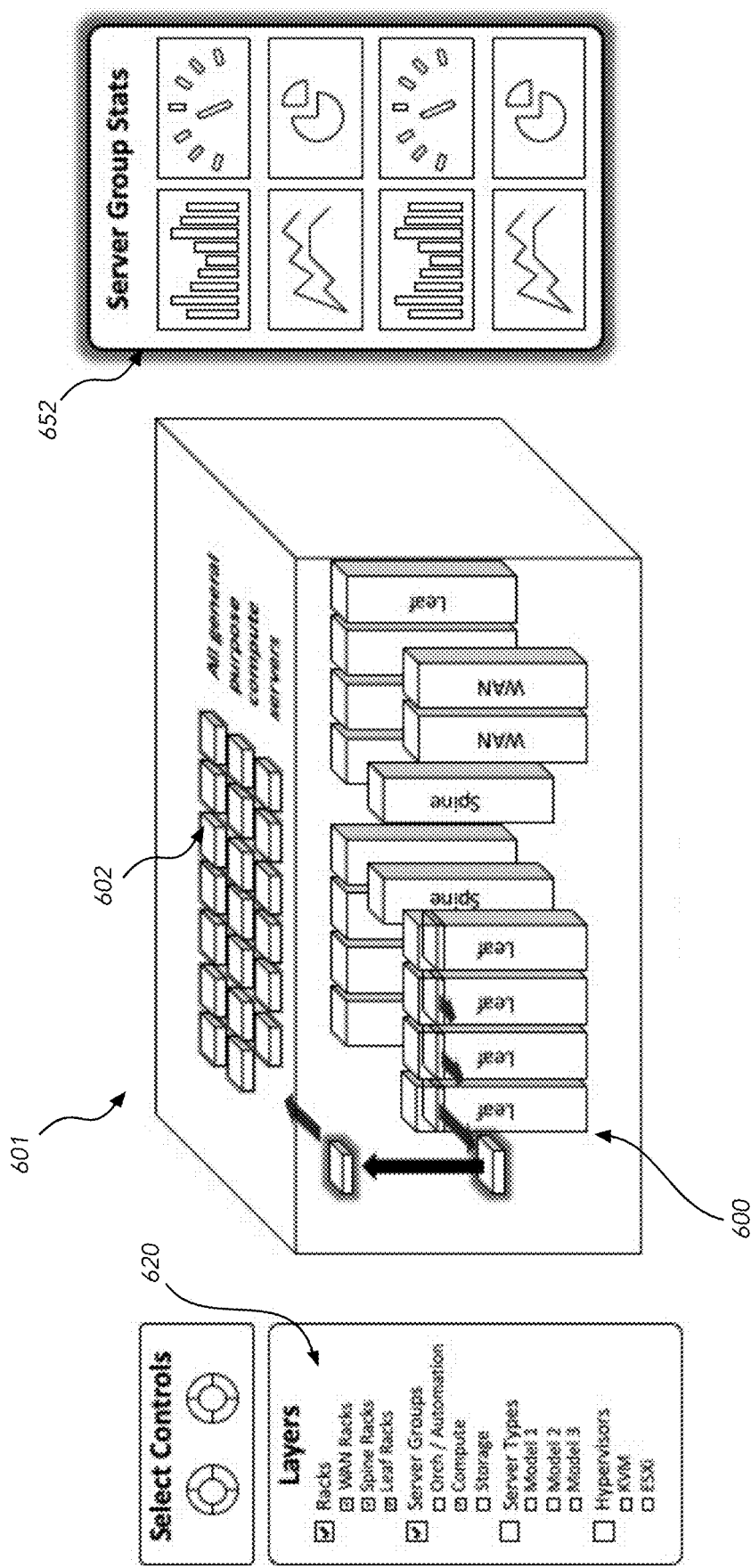

FIG. 6b illustrates how the system and method can isolate or indicate or make visible to the user all of the general-purpose computing servers in the system or a given portion of the system. The interface, model and output displays are configured and arranged by executing instructions therein to render the general-purpose compute servers 602 from among the computing assets 600 described before. In some aspects, these are animated and pulled out so as to clearly show them to the user.

Figure 6C:
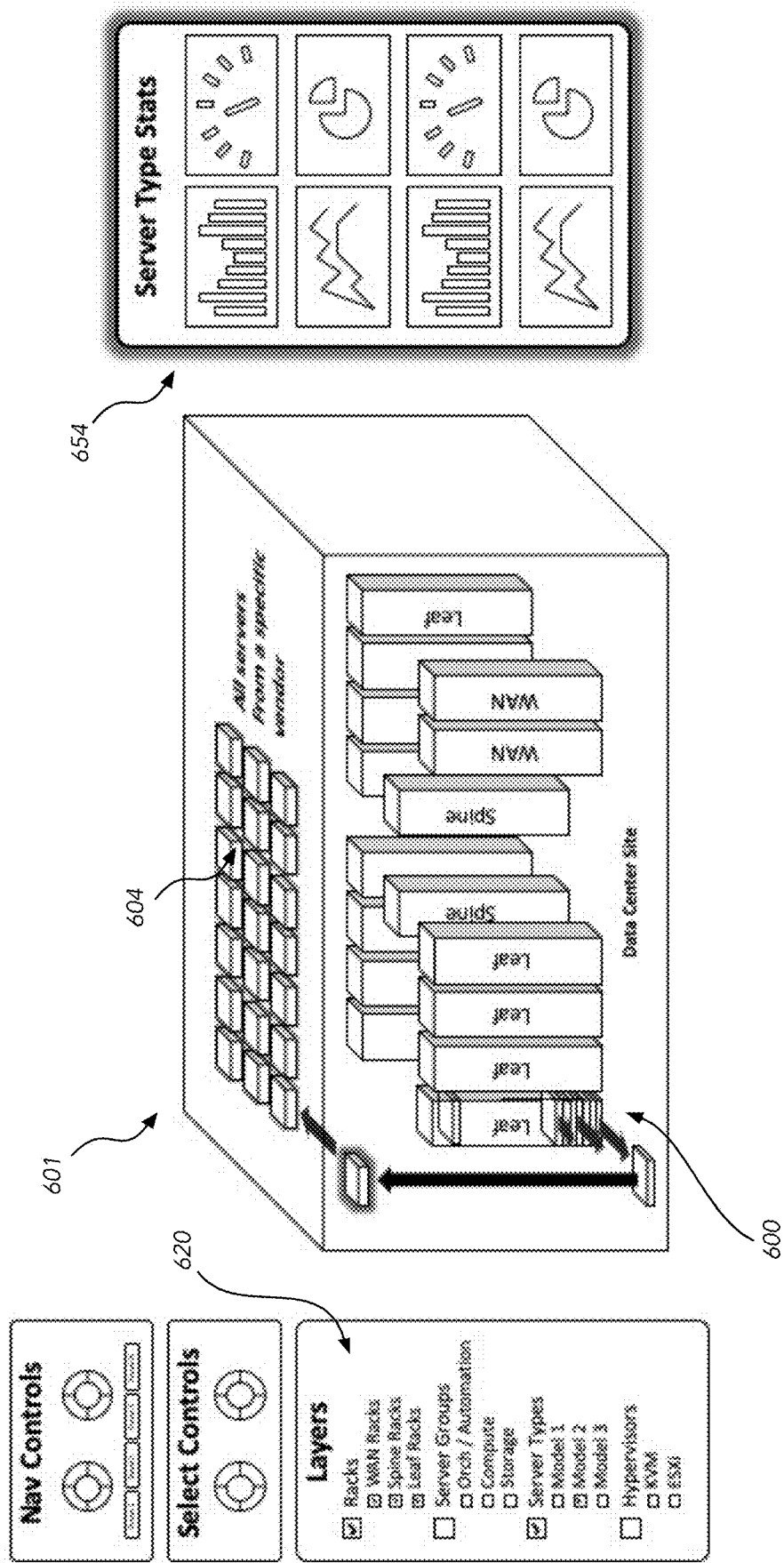

FIG. 6c illustrates how the system and method can choose to isolate and display all computing resources (e.g., servers) 604 from a given vendor in site view 601, or all servers or assets that are of a specific model as selected in control panel 620.

Figure 6D:
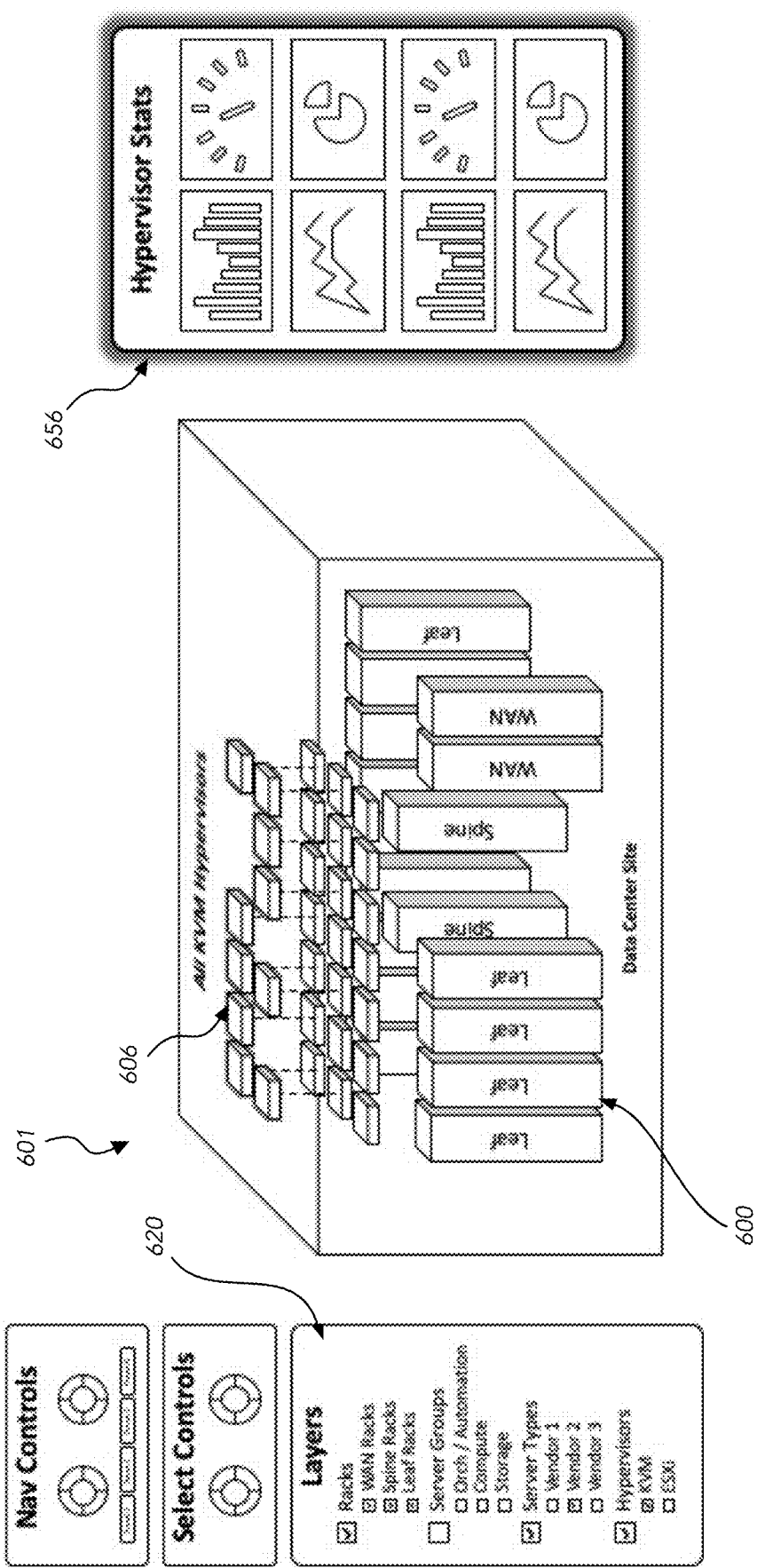

FIG. 6d illustrates an exemplary site view 601 with a hypervisor stats panel 656 and associated special hardware and/or software for implementing a virtual server resource which can be referred to herein as a hypervisor 606 isolated or visually distinguished in their respective layer. In one instance, the hypervisor comprises a special set of machine-readable instructions executable on a processor causing said processor (e.g. in a server) to effectively become and operate as a virtual server (be virtualized). In another instance, the hypervisor may comprise a kernel-based virtual machine. In one embodiment, a user can select which hypervisor(s) are visible on a user interface using a filter panel or control panel 620.

In some or all of the present examples, the system and method can implement the identification and illustration of the chosen assets using a model-driven object animation according to optional embodiments of the present system and method. Here, the multitude of servers (or other resources) are depicted as the system animates their extraction from their respective server racks. In this non-limiting example, the servers are set out visually above the server racks for simplicity and clarity, but other illustrative depictions are equally possible and valid. In this example, an operator has chosen certain characteristics, attributes or features of the system that are desired to be reviewed. Only the servers associated with the selected attributes are animated to be pulled out from their racks and laid out.

Figure 7:
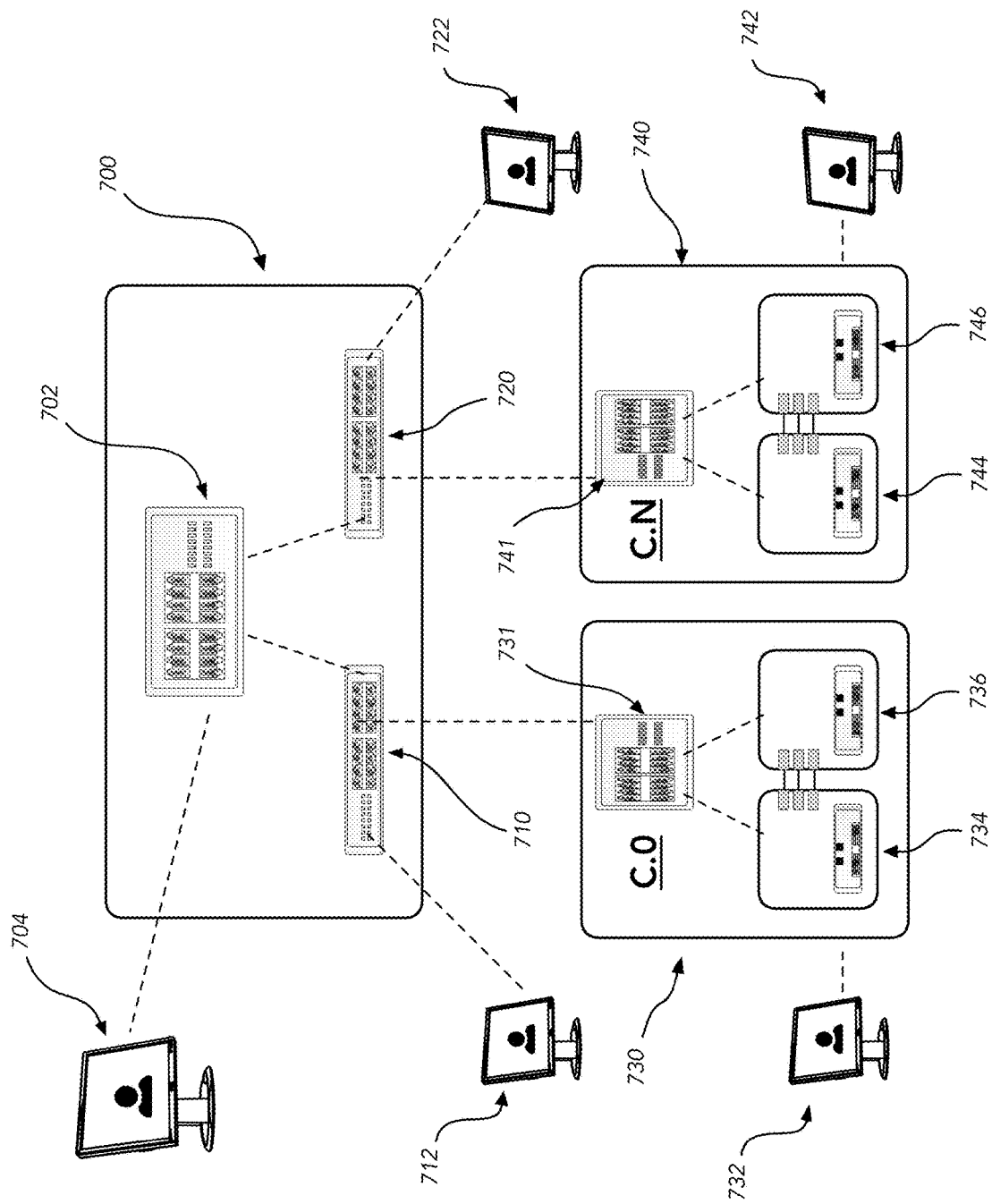
FIG. 7 illustrates an exemplary architecture for use in the present system and method.

As depicted in FIG. 7, the present invention provides, inter alia, a distributed network automation infrastructure and method that simplifies the integration, packaging, deployment and operation of end-to-end solutions. The solutions may be organized as a distributed automation framework designed to run as a hierarchy of nodes that leverage a common data model. The node hierarchy acts as a unified system with a common API and modular web user interface that can be hosted in public clouds or as an air-gapped implementation on a customer site. The grouped account manager components may be operated and accessed by the owner or operator of the present architecture, which is used by a plurality of customers (C.0, . . . , C.N). Each customer may also have settings and features activated and set up to the customer's needs and may be operated by information technology (IT) personnel of the respective customer. The customers are thus sometimes considered or set up as tenants in this architecture. It is understood that one or a plurality of such tenants can be managed by the present system and method.

In the example of FIG. 7 an online account management system 700 having a customer C.0 administration server 710 coupled over a data communication network to customer C.0 tenant architecture 730. Account management is possible from control panels, interfaces or consoles 704, 712, 722. Customer C.0 tenant architecture 730 in turn comprises a local instance tenant account server 731 and a front end 734 and back end 736 of the local instance for tenant customer C.0. Similar connections and hardware and executable instruction sets are implemented for each other customer C.1, C.2, . . . , C.N. The client tenants themselves can observe and control aspects of the local instance architectures through terminals or consoles 732 . . . 742.

In an aspect, the present architecture comprises a front-end and back-end framework as mentioned above. A central site implementation is broken into a set of front-end and back-end components. The front-end consists of the web server framework, user authentication framework (and fulfills a portion of the security architecture related to securing browser sessions and user credential information). A back-end framework hosts the system object model. The object model leverages a Relational Database (RDB) implementation with a Database Abstraction Layer (DBAL). The DBAL allows the object model and schema to be automatically rendered onto various types of databases for varying size, performance and scalability requirements. The DBAL uses an API gateway implementation to expose a North Bound Interface (NBI) that supports a variety of client types and enforces API endpoint security. It should be understood that the foregoing examples are merely illustrative, and the overall invention and disclosure are not intended to be limited by these examples. Those skilled in the art will appreciate in each of the illustrative examples and embodiments described that other equivalent or substitute embodiments and examples are equally valid and comprehended by this disclosure.

Still other aspects of the present architecture employ a transactional workflow engine operating in conjunction with the RDB to perform system actions. The workflow engine is model driven with a workflow schema that defines workflow steps and stages. Workflow steps consist of objects (and their modeled attributes) in conjunction with a set of actions.

Workflow actions are also stored in the model and can consist of a variety of simple or complex operations. These operations can be defined or categorized in a number of ways, for example as: Directly mapped attributes; Derived attribute values; Simple Boolean logic operations; Complex arithmetic operations; Regular expressions; If-then operations; Do-While loop expressions; Custom functions; User input data; Web UI interactions; Events and Notifications; and Failure remediation actions. Those skilled in the art will appreciate that these categories can be generalized or defined differently and are thus provided for the sake of illustration and not limitation.

In one or more embodiments, Workflow stages are grouped collections of workflow steps. Workflow steps and stages are composed either using a set of API calls or visually using the Web user interface or (UI).

The present system and method may also employ a change set manager in some embodiments. Once a configuration data has been entered the collection of configuration changes are submitted to a change set manager process that compares the running state of a given solution with the change set. Users have an opportunity to see the change set comparison and commit it or go back and modify the change set prior to committing it. Once committed, the workflow engine processes the change set as a sequence of transactions. If a workflow should fail during the process of committing the changes the step or stage is flagged as failed and a log is generated documenting the set of transactions completed prior to the failure event and correlates the failed transaction step with the actions, attributes or values that caused the failure. For common failure events, remediation steps may be defined that can either automatically execute or wait for user intervention to complete. Again, these features are not required in all embodiments of the invention but are provided by way of illustration of optional aspects employed in one or more embodiments.

Event logging is also comprehended in an aspect of the invention and can be applied to one or more embodiments of the present system and method. Statistics, events, notification and faults are delivered to the central site over a message bus layer. Statistics, Events and Notifications delivered via a message bus are collected in a Time-Series Database (TSDB) which may be queried by API or presented in the Web UI. Configurable thresholds can be defined on statistics allowing them to generate specific event, notification or fault conditions. Whether transitioned as threshold crossings or native event and fault notifications, these conditions are also able to be tracked as operational states in the RDB and correlated with logs in a dedicated logging framework.

Figure 8:
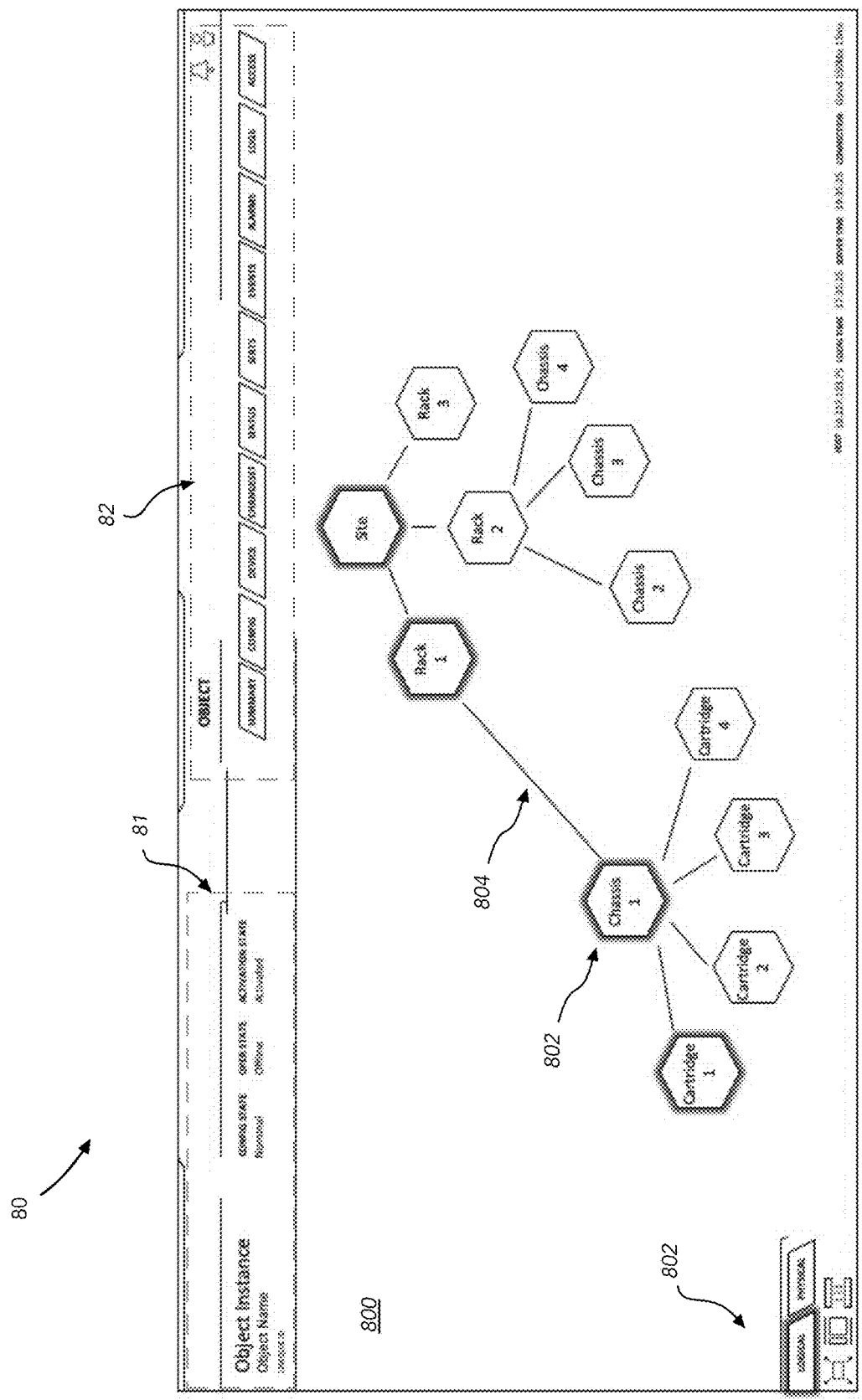
FIG. 8 illustrates a logical view according to an example.

FIG. 8 illustrates a logical view 80 shown in a window 800 of a console display for monitoring and controlling networked assets according to the invention. One indicator highlights or indicates that this is a logical view (as opposed to a physical view to be discussed below). The assets are represented logically and graphically at 802 and their relative communication and control paths by connections 804. Various information can be presented in layers that overlay one another in a given view and which in some aspects are controllable by a user to show or hide information displayed in said layers. In a particular aspect, discussed further herein, said layers may be adjusted to have non-visible (transparent) backgrounds and/or to have variable window sizes and/or variable relative positions on the overall display 80 to give a user an impression that the information in each of the overlapping or overlaid windows is selectively shown to the user. In this way, custom monitoring and control views are possible. The customizable layers may be thought of as 'screens'. FIG. 8 shows how a first screen with transparent background could be positioned at or near the upper left portion of the overall display 800 while a second screen may be positioned at or near the upper right portion of display 800 and so on. An arbitrary number of such invisible-background screens (e.g., indicated by the dashed line boxes 81, 82 which would not normally be seen by the user) can be positioned adjacent to or overlapping with one another and to the user they will give the appearance of a combined or union of all visible objects in each shown screen.

Figure 9:
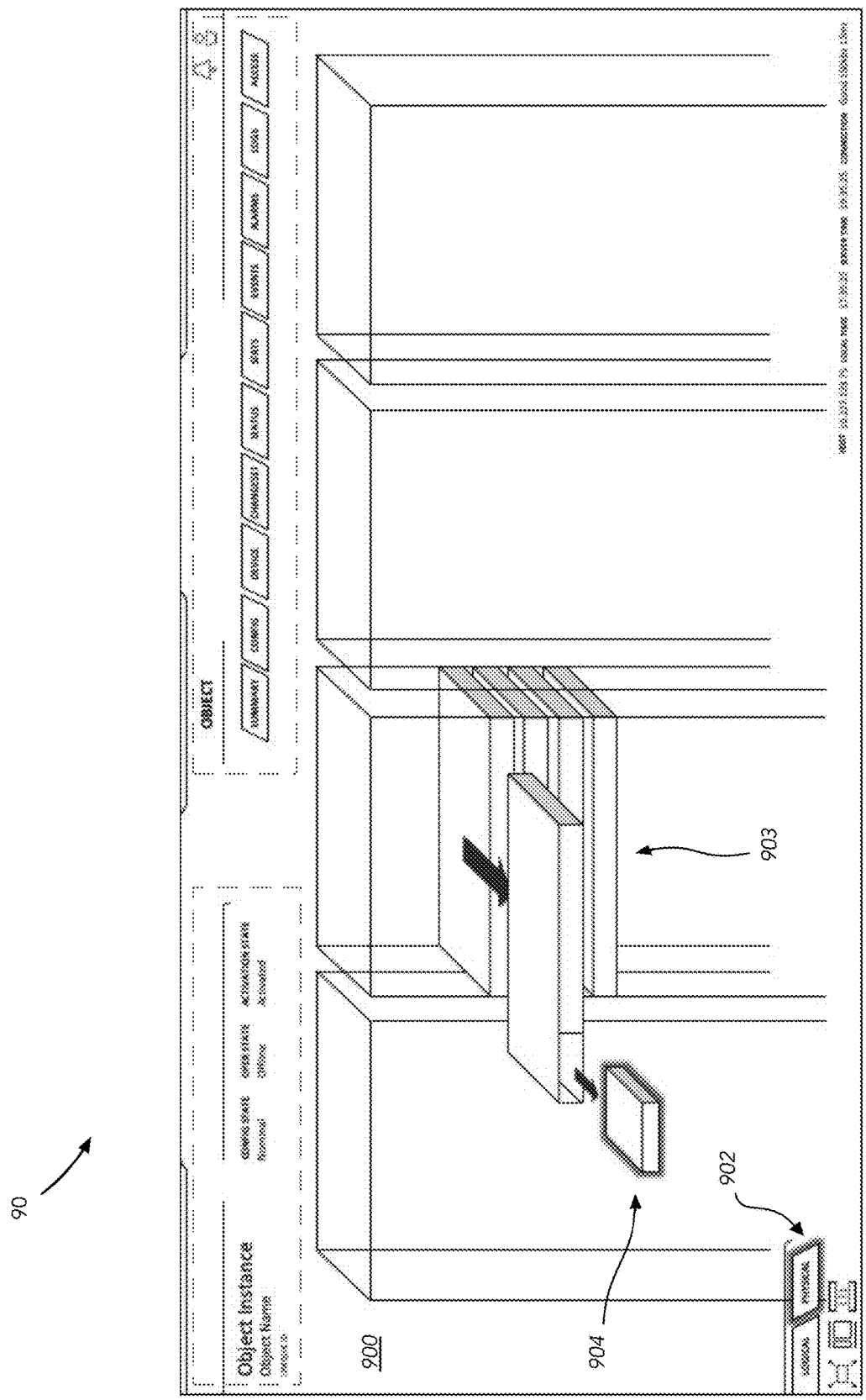
FIGS. 9 and 10 illustrate aspects of a physical view according to some examples.

FIG. 9 illustrates a physical view 90 shown in a window 900 of a console display for monitoring and controlling networked assets according to the invention. Indicator 902 may be implemented as a distinct screen with a transparent background and positioned and sized as appropriate on the overall display. In the example (e.g., IT assets such as server racks or similar assets) 903 we can see how a workflow or operation can be animated or graphically represented to allow a certain one or more individual assets 904 to be configured or otherwise studied and operated with further specificity. While the present drawings do not permit showing an animated view of an exemplary aspect of this invention, those skilled in the art will appreciate that the time-sequence view can be shown to its user on the console display in the form of an animation of a plurality of graphical vector and/or image frames to indicate a clear operation or movement or transition of one or more assets 904.

Figure 10:
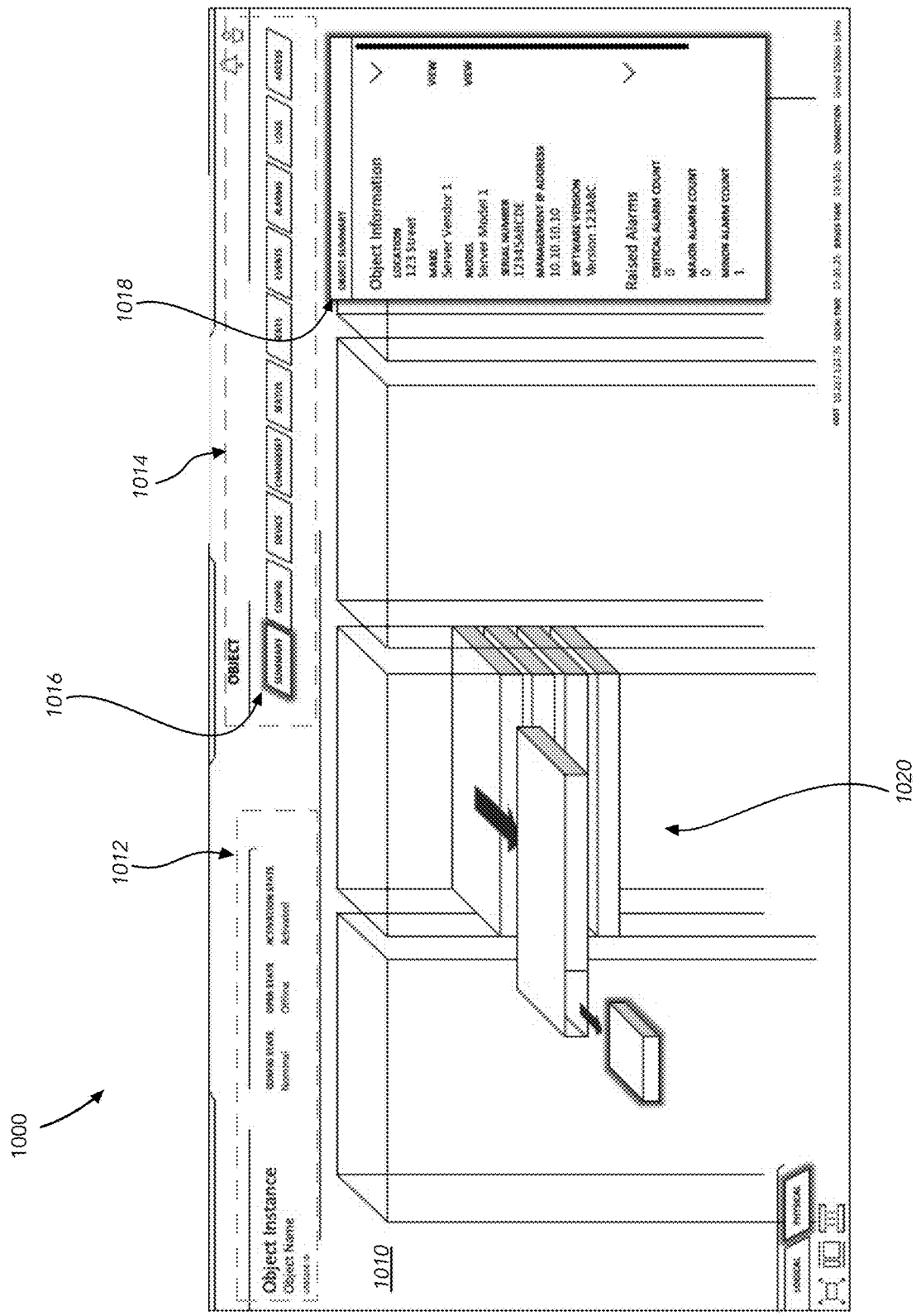

FIG. 10 illustrates a physical view 1000 including a plurality of the above-mentioned screens 1012, 1014 (and more) with invisible backgrounds and each displaying a corresponding set of information, words, graphics and so on. Specifically, in this exemplary aspect, various 2D control tabs or user-interactive controls 1016 are presented in one such screen. The particular control 1016 acts as a button allowing a user to move his or her mouse or cursor over the control 1016 which then accepts a user action such as a mouse click or double-click action. Those skilled in the art will appreciate that other such user-interactive controls may be presented such as slider controls, input boxes, radio buttons, and so on. The certain control 1016 of our example can be activated or highlighted by the user's actions. A corresponding and resultant foreground layer 1018 would then be made visible on screen 1000, and which will show information in layer 1018 relating to the selected or actuated user-interactive control 1016. Information about a selected asset 1020 (e.g. a cartridge server with four computing boards) may be the information in layer 1018.

Figure 11:
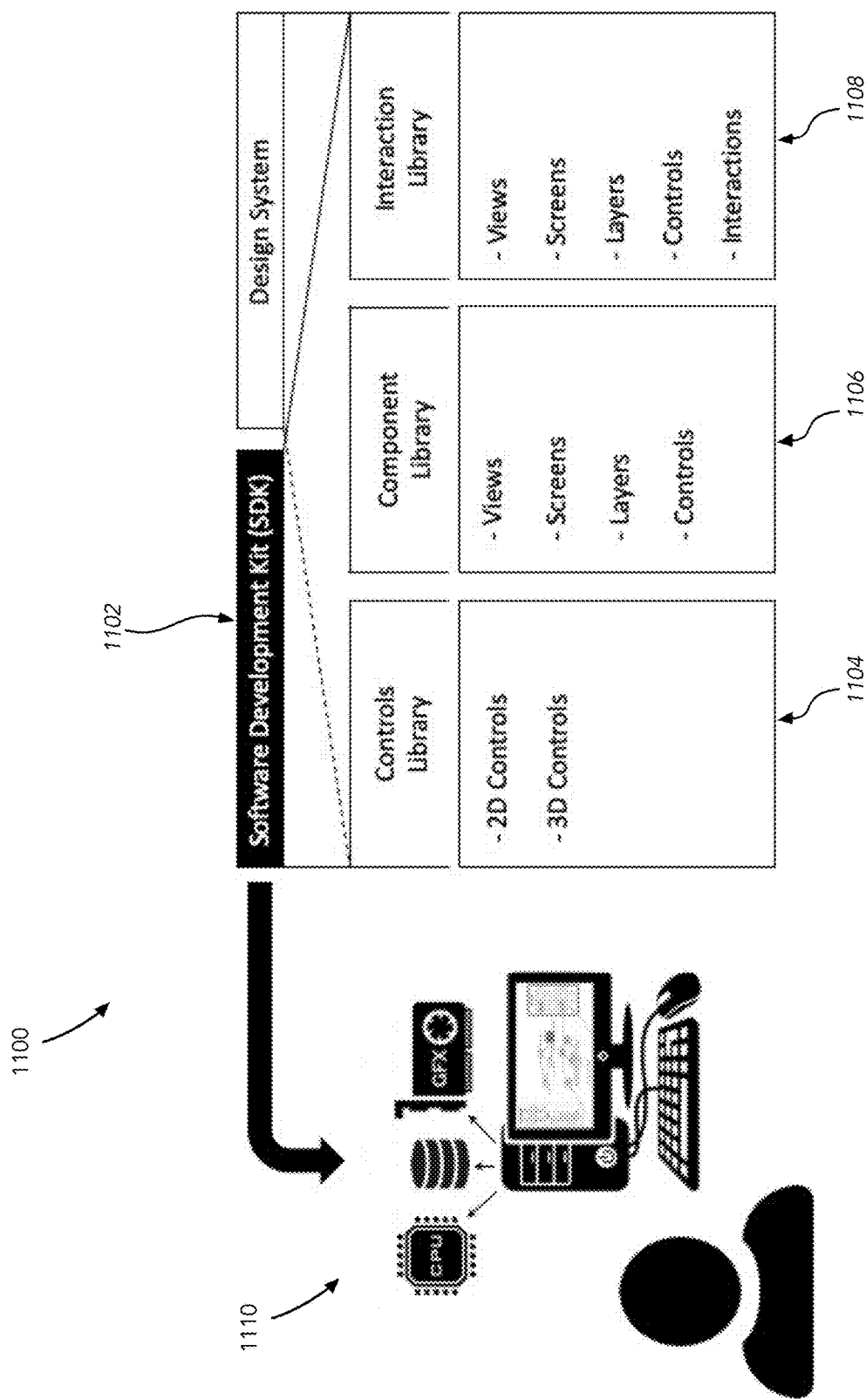
FIG. 11 illustrates provision of a SDK and other aspects.

FIG. 11 illustrates a paradigm for providing tools in a system 1110 and method as described herein. The system and method permit a user to monitor and control a selected asset or group of networked assets using an apparatus comprising a CPU processor, data store, graphics circuitry (standalone or part of said CPU), and a console equipped and configured as described herein 1100. In an aspect, the above-mentioned features can be created or configured by tools (e.g., programs and instruction sets) provided to a developer, customer or other IT professional and can comprise a software development kit (SDK) described by options and features 1102. The SDK can further comprise a Controls Library 1104, a Component Library 1106 and an Interaction Library 1108. The SDK 1102 may be published to its authorized users. The Controls Library 1104 may include user interactive controls such as text entry boxes, radio buttons, drop down menu controls, and other items which in an example are Javascript libraries configurable for computers, mobile devices and other equipment. These controls can be embedded into the afore-mentioned screens and layers to be presented to an end user during operation (running) of the system. The Interaction Library 1108 includes actions which may be designed to take place in the system upon pre-determined interactions between an end user and a console on which the controls are presented during operation. Examples of interaction library elements includes mouse/cursor movement, selection, clicking, double-clicking, hovering and so on.

Figure 12:
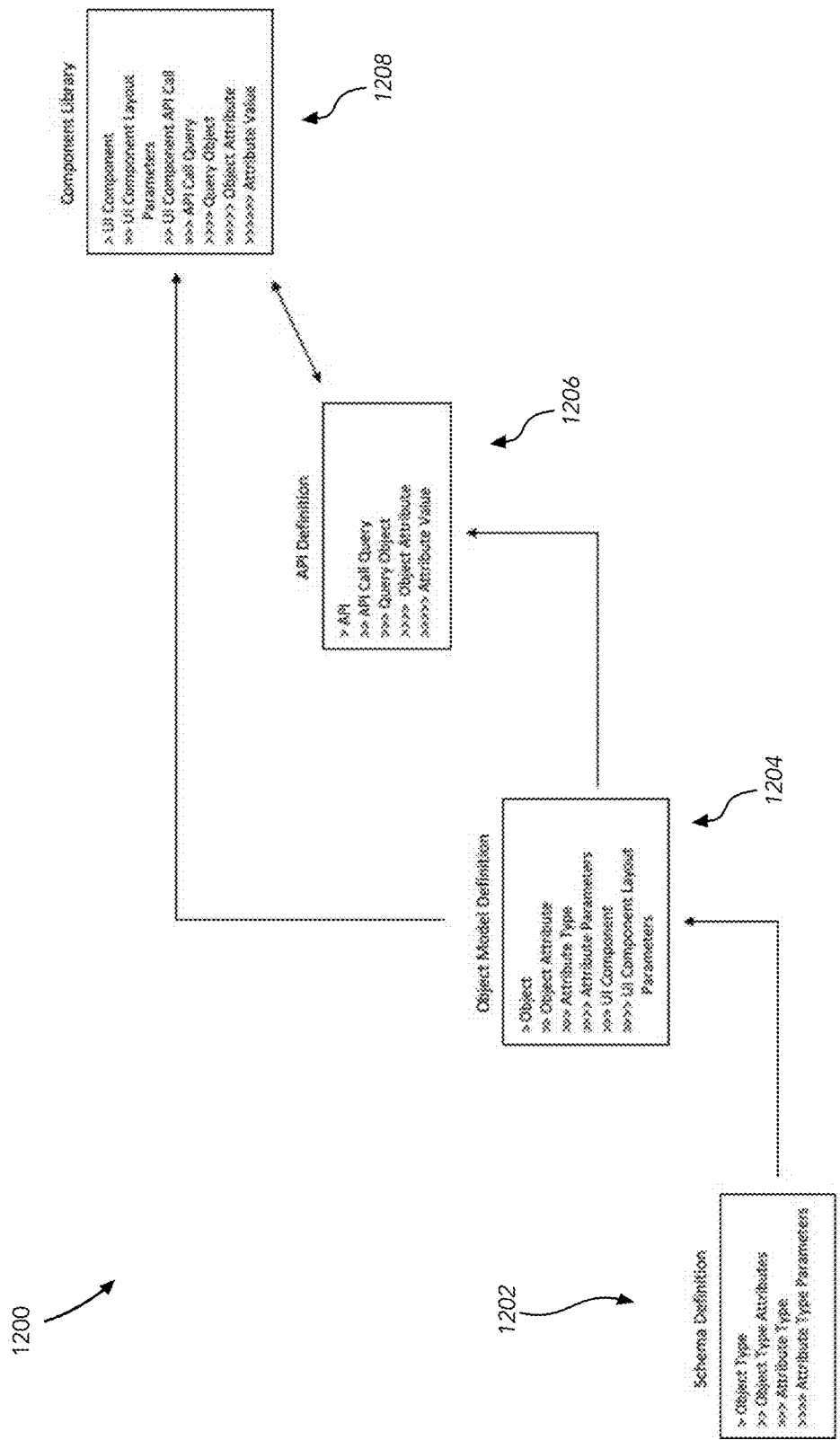
FIG. 12 illustrates concepts and definitions relevant to one or more embodiments.

FIG. 12 illustrates a simplified logical relationship 1200 between an exemplary Schema Definition list 1202, Object Model Definition list 1204, API Definition list 1206 and Component Library list 1208 according to a non-limiting embodiment. Those skilled in the art will understand that the illustrated examples can be expanded, limited or varied in many ways without departing from the scope of the present disclosure and invention. The relationships illustrate exemplary mechanics of how a present model is used to drive the SDK described above. Objects are instances of the schema with relevant corresponding data associated therewith. A web browser on which the method is presented would automatically take in the present model elements and is programmed to make responsive API calls to its client computer system.

The present interface or Web UI may use the same API interface to the automation framework presented to other systems for integration purposes. In an embodiment, it comprises a set of Angular components allowing it to parallel the modularity of the distributed automation framework. The Web UI architecture contains a rich set of components ranging from simple list and form controls to sophisticated components such as catalog components and a WebGL-based 3D rendering engine for creating VR-like scenes in the Web UI providing contextual information about objects or allowing the user to interact with them for configuration or troubleshooting purposes. The user of the present system and method can apply these principles in coordination with a customer/operator to construct specific screens supporting standardized use cases such as remote site server bootstrapping, configuration and operational management. The Web UI components are theme-able and skin-able allowing customization of the solution for a specific customer.

As can be seen, the present system and method allow for monitoring and control of networked assets, namely physical assets, which can include machines, e.g., information technology machines, communications machinery, transportation machinery, industrial, military, healthcare, entertainment or almost any arbitrary type of physical controllable asset that is coupled to said network and reachable over the network. The network may be a data communication network that can send and/or receive status monitoring data informing a remote operator or control center about one or more conditions of a networked asset. The network can also send and/or receive control or configuration signals that cause an asset or a controller of said asset to change a controllable feature on said asset.

In a simple example, a collection of irrigation pumps are coupled to a network. Each pump is a networked physical asset. A given pump's operating conditions (e.g., power, speed, temperature, or other parameters) may be communicated over the network to monitor the status and operation of the pump. In an aspect of this invention, a console is provided that models and renders a high-quality graphical representation of one or more of said pump assets on a display screen of the console, preferably at a gaming-technology level of modeling, rendering and display. The model of the pump may include a realistic representation of the appearance of the asset (pump) and may be generated by a vector graphics hardware/software system running on said console. The modeling and generation of such vector graphic images of the asset is a visual aid to an operator using the console. For example, the operator may be shown a three-dimensional depiction of the pump and/or pump controls such as a representation of a control panel of said pump, having, e.g., to adjust controllable features of the asset (pump). The depiction of the physical asset is preferably performed using high-end graphics components (hardware, software) that conventionally would be employed in gaming technologies but modified for the present use and executing the present modeling functions. Of course, other examples and fields of use for this invention and feature description abound as would be appreciated by those skilled in the art, all of such examples being comprehended by this disclosure and scope of the appended claims.

A dataset, accessible by one or more networked computers or consoles, is provided comprising an organized collection of data representing the operational state and other parameters concerning the physical assets being monitored and controlled. Changes to the state of an asset will be reflected in an updated dataset. The aforementioned rendered representation of an asset is generated using the present model to reflect the specific operating condition of the asset as found in corresponding data in said dataset. For example, if a pump asset is powered on it may be represented in a first color (e.g., green), but if the pump asset is off it may be represented in a second color (e.g., red). It should be understood that the instant examples are not limiting and can be extended to myriad other examples. For example, the system can monitor a valve in an industrial plant, rendering a representation of the valve based on a model and dataset containing information about the actual condition of the valve, depicting the valve in an open, closed or other condition as appropriate. In yet another example, a communications or information technology asset can be represented by the present method and system to show its state of operation, e.g., a modem communication can visually show the state of any status lights on its front panel, or a data storage device may be depicted with a graphical representation of how full the device is.

In another aspect, the invention also provides systems and methods for actively controlling one or more controllable features of a networked physical asset. This is done with a graphical user interface (UI) implemented in the console which an operator can interact with using user interface equipment such as touch screens, mouse, trackball, keyboard, stylus pens, or other interactive accessories. The operator is provided on the display screen of the console with certain user interface tools that correspond to the controllable features of the asset. The console graphics hardware/software render two-dimensional or three-dimensional user interface tools (e.g., radio buttons, on/off buttons to toggle a function, pull-down menus, text entry boxes and so on). When a user interacts with the rendered user interface tools (for example an ON/OFF button or a speed control or a voltage indicator) the method and system receive the user's input and generate a corresponding control signal that in turn is conveyed to an asset or asset controller.

Some networked physical assets are not intelligent enough (i.e., lack the necessary hardware, software or processing capability) to directly communicate with servers and consoles using network communication protocols. In such cases a controller circuit or box or computer is used to convert control signals from a user console to actuation signals to achieve the desired function changes. Other physical assets are more robust and include therein built-in sophisticated circuitry and logic that can directly receive user console control signals and act on them. Therefore, in some embodiments the physical asset contains a control circuit and logic while in other embodiments the control circuit and logic reside outside the physical asset itself—both of these embodiments are comprehended by this disclosure.

Figure 13:
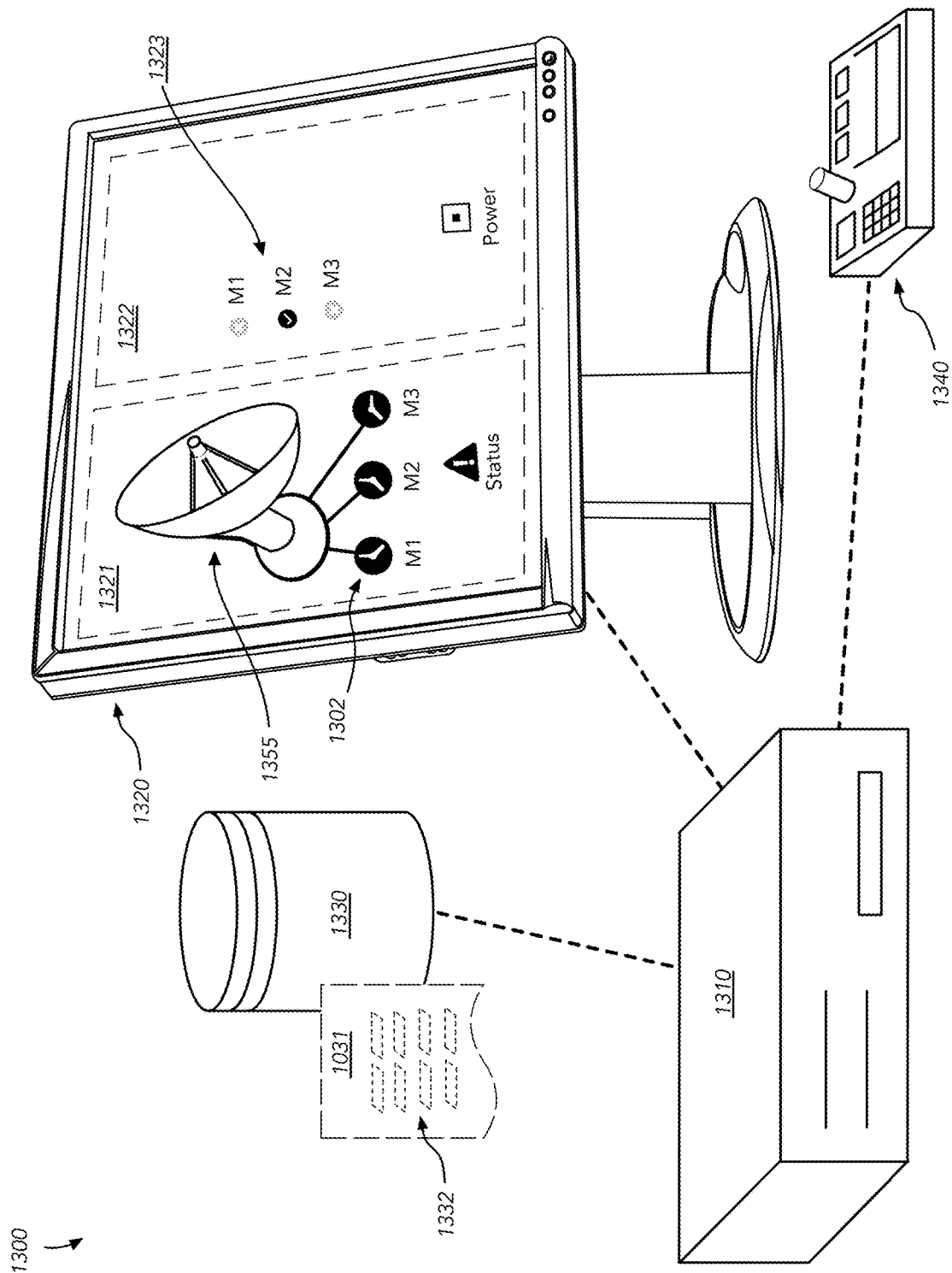
FIG. 13 illustrates aspects of a console and associated components.

FIG. 13 illustrates a computer system 1300 that in some examples has been referred to herein as a console. The console, as stated, can be of any suitable computing machine format such as a desktop computer, server, mobile computing device, laptop, tablet or other specialty computing equipment having one or more processor units 1310 including a graphics processing unit; a user interface controller or device 1340 such as a keyboard and/or mouse, joystick, trackball, or other input apparatus; a visual display screen 1320 such as a computer monitor; a data storage unit, database, or other information storage unit referred to herein generally as a data store 1330. The console 1300 may also include other ancillary operational components as would be understood by one skilled in the art, including but not limited to a power supply (AC or DC), a communications unit such as a data communications modem, and so on. The console 1300 is specially configured and arranged according to the present disclosure and is capable of storing, reading and executing machine-readable instructions in its processor(s) 1310 and rendering visible outputs on its display screen 1320 according to the present disclosure. The resulting configuration and functioning of the console 1300, especially in the context of the present network and networked assets and other features provides new and novel functions and performance advantages not previously known or possible in the art.

The foregoing specifically illustrates a powerful aspect of the invention. We see that data store 1330 can store information in the form of data 1331, which may be organized into a table, database or relational information structure, and which relates to a state of one or more networked physical assets in the field as mentioned before. The stored data 1331 includes specifically encoded information, values or parameters indicating the condition or state of various aspects of the monitored and controlled physical assets. Changes in the condition of one or more assets or features or parameters of the assets will be reflected in said database in datastore 1330.

Furthermore, the display screen 1320 of console 1300 displays modeled and rendered graphical asset representations 1355 of one or more of said networked physical assets. For example, the display 1320 includes a portion of said display 1321 dedicated to showing the condition and status of asset 1355. The asset, as stated before, may be rendered in any degree of realism or physically-appropriate depiction of the actual asset being represented. Additionally, one or more monitored or controlled features of the asset may be shown for an operator and may selectably displayed in portion 1321. Yet further, display screen 1320 may include another portion 1322 dedicated for user interface tools and controls. These user interface tools and controls can be graphical user interface widgets such as buttons, data entry boxes, menus, and so on used to affect a change of a controllable feature of a controlled physical asset. Again, if an operator changes a parameter or controllable feature of a controlled asset, a corresponding update to the information 1332 in table or data structure 1331 is recorded in data store 1330. Data store 1330 is not necessarily contained in or exclusively associated with one console but may in some embodiments be distributed or associated with a server coupled to a same network as the console or consoles. The data 1031 is in the end accessible as necessary by the console(s) so as to achieve the above functionality. Those skilled in the art will understand that this functionality can be implemented in more than one unique way, for example using networked components, grouped components, client-server systems, cloud-based systems, and others.

In some aspects, the graphical representation in section 1321 of display 1020 and the user control section 1322 of display 1320 are associated or married through rendering software and hardware running on processor(s) 1310 of console 1300. In one non-limiting example, a substantial footprint or area 1321 of the surface of display screen 1320 is allocated to displaying the one or more physical asset representations 1355 and their status 1302 while a correlated and corresponding and substantial footprint or area 1322 of display screen 1320 is allocated to displaying the user interface tools associated with the selectable controllable features 1323 of said one or more physical assets in question. So, on one screen 1320, a console user can see (1) the state of and a model-generated pictorial representation (preferably gaming-quality realistic 3D vector graphical representation) of one or more physical assets and their state/status as well as (2) a group of model-generated interactive user interface tools or widgets 1323 made to correspond to the controllable features of the physical asset(s), wherein both the displayed condition of the asset(s) and the user interface tools correspond to respective data in a dataset stored in a data store available to the console. The same dataset preferably keeps the information or data describing the state and controllable features of the asset(s) as well as any parameters or values used in controlling the asset(s) from the console over said network.

As mentioned earlier, the models for generating the views of the rendered assets can be high-quality models such as generated by gaming-ready hardware and software and in some cases using modified implementations of gaming graphics hardware and software suited for the present purpose. The rendered 3D representations of the present assets are not merely stored images of a same or similar asset (for example, if the asset is a vehicle, the present system generates and provides a rendered model of such a vehicle and not just a stored picture of a vehicle).

In some aspects, the rendered physical asset is rendered to show an actual condition of the asset. For example, if a satellite communication dish is the networked physical asset, the satellite communication dish may be rendered and displayed, using a graphics model and resources, so as to indicate the asset's actual elevation angle, azimuthal position, or other aspect of the asset. In another example, if the asset is a piece of computing hardware with LED indicator lights on its control panel or front or back interface (in real life) then the invention may use the graphics capabilities of the console to generate and display a real-time or near-real-time representation of the same or similar piece of equipment including the state (on/off, color) of any such indicator lights. This greatly assists a console user in quickly visually observing an accurate state of the asset, instead of reading the asset's condition for example from a generated spreadsheet or text output. An operator who is used to touching and operating a physical asset locally can use the present system and method to remotely operate the asset with near or same level of ease because the indications and controls of the asset are in some embodiments mirrored in the graphical representations of the present invention.

It is to be understood that the present exemplary outputs and illustrations are only provided to show the reader examples of the many available and possible uses and instances of the invention. Those skilled in the art will appreciate the many other examples of input/output, control, interface and presentation formats and features possible using the invention.

In a networked system, the workflow engine, change set manager, statistics/events/notifications/faults and logging subsystems can be replicated at remote sites. Because the entire system runs as a set of loosely coupled microservices packaged and orchestrated as a set of containers they can be deployed in several different form factors. At a cloud site the remote automation framework bundle can be natively deployed as a container. Within a data center the remote automation framework bundle can be deployed as a container on a VM or on bare metal. At remote sites, the remote automation bundle may be deployed as a container on a server cartridge or on a standalone micro-host.

A non-limiting exemplary embodiment provides efficient form factor remote computing modules (sometimes referred to by the present inventors as compute sticks) into the management switch at a remote site. This can be deployed in multiple alternative ways, including for example: 1) As a temporary host to perform one-time workflows to bootstrap or upgrade a site. 2) As a permanently deployed solution to act as an out-of-band automation network for ongoing automation workflows and to operationally manage full solution stacks or monitor then for service assurance use cases. The hardware footprint (and container cluster dimensioning) at any given site will determine the complexity of automation work that may be accomplished at a site and the automation solution's performance envelope and scalability.

The present system and method also provide automation adapters in some embodiments. Remote site automation nodes provide a southbound abstraction layer defined as a variety of adapters to third party hardware and software, and may be applied to a variety of applications, including for example to: Custom hardware devices; Operating systems; Container frameworks; Configuration databases; Logging frameworks; AAA systems; Off-the-shelf servers; Virtualization frameworks; Public cloud APIs; Message buses; Time-series databases; and Custom applications.

An adapter may be a separate model with its own schema. The schema for an adapter is specific to the interface of a third-party component or user. Therefore, a variety of adapter models are possible and might represent RESTful API calls, Netconf/Yang models, web sockets, CLI commands or RPC calls as examples.

Therefore, the present system and method can provide interactive model-driven monitoring and controls environments to operators of complex networked systems. The systems and methods include model driven geographic or physical environment scenes available on game-quality hardware and graphical systems running game-quality software and rendering and modeling software.

As mentioned, the invention may be organized into a "front end" and a "back end" or combinations of such architectures. Applications range as described above but can include monitoring and control of 5G communications assets and systems and allows the servicing and activation of assets within the system. Some features allow for moving assets in networked systems towards or to the edge of said networks.

The geographic and physical environments (indoor, outdoor) have been demonstrated by the present applicants based on open source map technology (e.g., map client) combined with game graphics technology to deliver previously-unknown and highly effective system monitoring and control. The assets of the systems being monitored and controlled are sometimes provided using map and asset layers and usable with simple (e.g., Web browser) tools by the end users or operators.

An instance of a software asset or application can be initiated or terminated by an operator using highly organized and detailed menus or other user-driven interfaces. In some aspect the interfaces highly resemble their actual physical counterparts such as by depicting the physical layout or controls panels of hardware resources represented in the interface. In other instances, the application code can be moved using the system and method.

Figure 14:
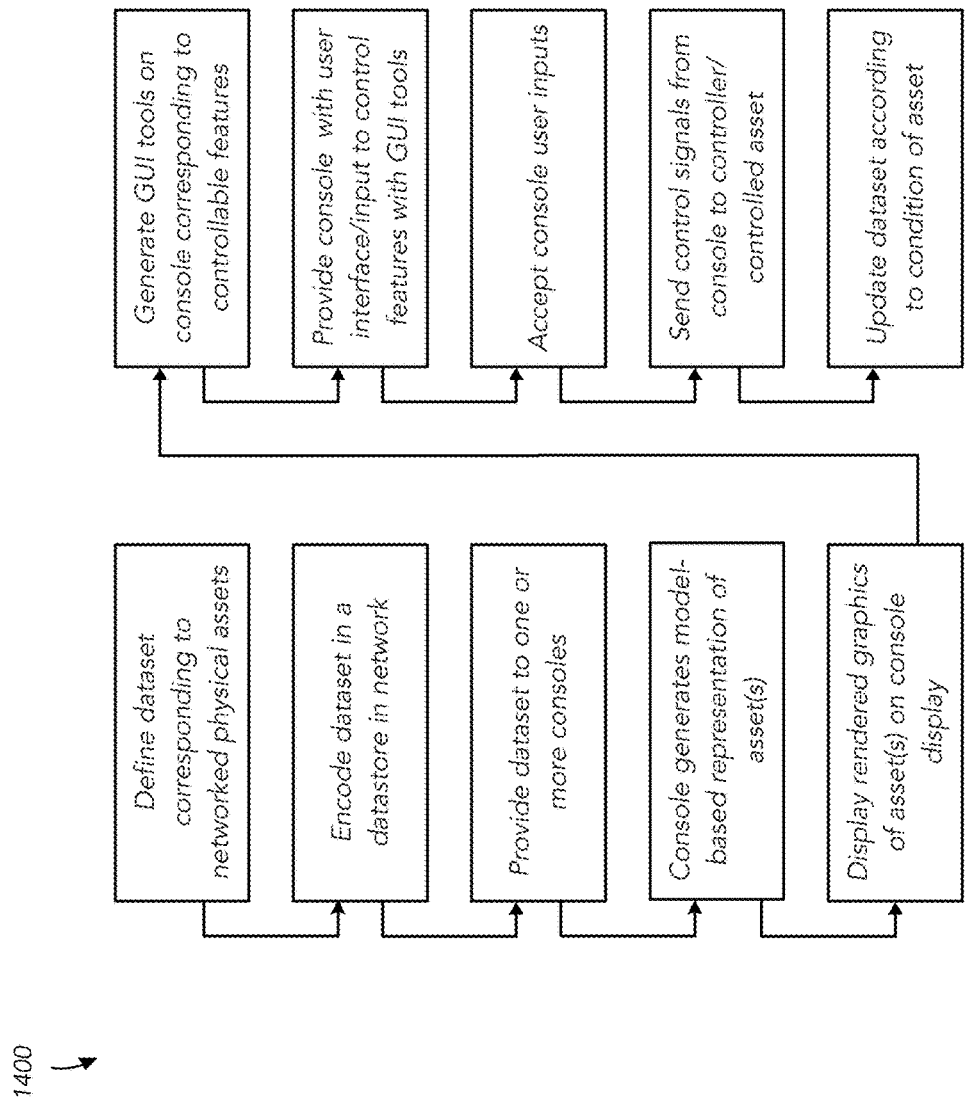
FIG. 14 illustrates an exemplary method according to the invention.

FIG. 14 illustrates a computer-implemented method 1400 for monitoring and controlling networked physical assets according to the invention. The method 1400 is representative and for illustrative purposes, and those skilled in the art will appreciate that many other incidental acts or groups of acts can be constituted in, instead of or equivalently to those depicted. Also, the sequence of acts should not be understood to require the overall method to take place in a certain order as some steps can be carried out in a different order or concurrently as best suits a given implementation.

Here, a dataset is defined, and models are proscribed for identifying and modeling and representing physical assets and their operational states and parameters, including one or more controllable features of one or more networked physical assets. The dataset is encoded into a suitable machine-readable medium or datastore coupled to a network and accessible or provided to one or more consoles as described. The consoles are equipped with and generate vector graphic high-quality models and graphical output representing one or more selected physical assets, which are shown on respective display screens or monitors of the consoles. The consoles are further configured and equipped, programmed and arranged to model, generate and display graphical user interface tools that a console user can use to select or vary or enter choices and instructions into. The user's selections and choices and the graphical interface tools correspond to respective controllable features of the networked physical assets. Once selected or entered into the user interface tool(s), corresponding control signals are generated and are conveyed to a server, a controller or directly to the associated controllable physical assets to change or update respective controllable features of the assets.

One asset at a time may be monitored and controlled, or a class of assets can be monitored and controlled. For example, a user command through a console user interface tool can be used to turn on or off one pump or computer server asset as chosen. Or, the user/console can be used to activate/deactivate every pump or computer server in a system of such assets all together. Or, the user/console can choose to activate/deactivate all of the pumps or computer servers in a certain geographic sector, certain network address range, and so on. That is, a plurality of networked physical assets can be modified or controlled together if they have a shared class of attributes (type, location, address, condition, etc.)

While some parts of the systems described here are implemented using components available (such as devices used in imaging, communication, data processing, storage and so on) these components may be used in new and novel ways according to the invention, and may further be modified and adapted for use in or with the present system and method. Specifically, as will be discussed, various asset monitoring, sensors, controllers and processing circuits, and other features and components of the invention are designed, connected, programmed or executed in special and new ways to achieve the present objectives and attain the described outcomes and results. A conventional system was never configured or arranged to do so and could not. But in so doing, the present systems and methods significantly improve on the design and functioning of the described systems or components of the systems (and the resulting methods carried out thereby).

As an example, new and technologically-useful data objects, structures, tables, signals or other electronic elements that represent and convey novel and useful information have been devised and are input into, processed by, and output from components of the present system in the course of carrying out the present method. Newly generated data objects or files indicate or signal or represent and facilitate clinical conditions and are used to achieve and cause electronic processors, displays, imagers and other diagnostic and/or therapeutic systems to operate according to the present teachings. In some regards, these new data objects enable human operators to interactively observe, diagnose, control and manipulate physical assets and equipment in the field, remotely, in technically different ways from previous control systems and methods. Immediate and intuitive representations of distributed networked assets are generated by the present system and method and provided in new and useful data objects on which human or machine interactions can be based. Computer-based interactions between a machine and/or human operator and the new data objects of the invention enables novel results that include the output and creation of new and useful control signals and output data structures (including physical voltage and/or current signals encoding and representing control signals to physical assets) to tangibly affect said assets in a real and tangible sense.

No method or system was previously configured to take in signals and data files representing the physical state of an asset's controllable features and operate on the same using a programmable circuit or processor, and further using a machine learning engine and connected data store, in order to define a physical analog of an actual machine or other physical asset reachable over a data network. By taking existing and new components, instructions, processors executing said instructions, and computer-based input and output modules the present inventors have conceived of and implemented such a new and useful system and method for the first time.

It should be apparent to those skilled in the art now that the present systems and methods employ significant and new technical features that, for example, integrate a plurality of co-existing and customizable interface panels in a console machine, each panel having new and customized data displays and control functions. The new and customized data displays and control functions have been created and implemented by the present inventors in processor-driven machines that are configured and arranged to generate and store and transmit encoded graphics primitives such as invisible (e.g., transparent or color-matched to a larger background) background window panels, user interface elements that support some or all existing user interactive actions (e.g., clicking, hovering, dragging, or other UI or mouse/pointer actions) to give a user a desired information control panel that is integrated into a remotely-sensing and controlling network of controllable assets. Real values of controllable features of the assets are therefore integrally connected to and derived from machine-generated values of data objects generated by the present system and method.

It is again noted that several examples and preferred embodiments are set forth above. These are not given by way of limitation, but instead to best illustrate the invention and disclosed systems and methods. Those skilled in the art will understand upon reviewing the present disclosure that some components or steps may be optional and omitted, others may be added, without loss of generality. Equivalent or substitute components or steps may also be applied, remaining within the scope of the invention captured by the disclosure.

What is claimed is:

1. A method for remotely monitoring and controlling physical assets, comprising:

defining a dataset corresponding to a plurality of data-connected physical assets coupled to a data network, wherein each data-connected physical asset is associated with a respective feature set of the data-connected physical asset that can be monitored and controlled over said network using respective monitoring and control signals;

encoding said dataset in a data store coupled to said network;

serving said dataset to one or more consoles coupled to said network;

using a console graphics processing unit (GPU), generating a model-based three-dimensional vector graphics representation of said data-connected physical assets, along with respective states of said data-connected physical assets, based on respective data in said dataset;

on a console display screen, displaying the model-based three-dimensional vector graphics representation of said data-connected physical assets, including displaying a state of one or more controllable features of said data-connected physical assets;

using said console GPU, executing an interface abstraction layer to generate one or more model-based graphical user interface tools corresponding to the one or more controllable features of said data-connected physical assets;

on said console display screen, displaying a vector graphic representation of the one or more model-based graphical user interface tools so as to present an interactive control interface including said one or more model-based graphical user interface tools to a user of the console;

using said interactive control interface, accepting one or more inputs through said one or more model-based graphical user interface tools, the one or more inputs corresponding to one or more respective controllable features of said data-connected physical assets;

sending one or more control signals from said console to an asset controller, over said communication network, so as to configure said one or more respective controllable features of said data-connected physical assets; and updating a state of the one or more respective controllable features of the data-connected physical assets in the displayed representation of the data-connected physical assets on said console display screen, including updating a state of said one or more respective controllable features of said data-connected physical assets as displayed on said console display screen.

2. The method of claim 1, further comprising providing graphics extensions encoded into said console and executable on said console GPU to render said user one or more model-based graphical interface tools in a graphical environment displayed on said console display screen.

3. The method of claim 2, further comprising registering said graphics extensions in a registry of extensions and encoded in said data store.

4. The method of claim 1, said model-based three-dimensional vector graphics representation of said data-connected physical assets comprising a vector representation of an appearance of said data-connected physical assets to approximate an actual appearance of the data-connected physical assets.

5. The method of claim 1, said one or more model-based user interface tools comprising a programmable vector graphic representation of a user interface tool.

6. The method of claim 1, said one or more model-based user interface tools comprising one or more user interface widgets including one or more of: a text input box, a radio button and a drop-down menu.

7. The method of claim 1, the generating said model-based three-dimensional vector graphics representation of said data-connected physical assets comprising generating geometric elements in said GPU so as to render a three-dimensional visual representation of said data-connected physical assets on a conventional computing console display screen.

8. The method of claim 1, further comprising selecting a plurality of said data-connected physical assets and controlling said plurality of said data-connected physical assets sharing some shared class of attributes.

9. A system for monitoring and controlling networked physical assets, comprising:
   a computing console comprising a console processor configured and arranged to execute instructions for monitoring and controlling said physical assets, including instructions encoded into a data store of said console corresponding to a plurality of controllable features of said physical assets; and
   a graphics circuit configured and arranged to generate a graphical output onto a display screen coupled to said console, and particularly configured and arranged to execute machine-readable instructions to generate a plurality of displayable screen views onto said display screen, each of said screen views comprising a transparent background and screen coverage size and area, wherein a plurality of said screen views are simultaneously generated by said graphics circuit and presented in respective positions relative to one another on said display screen and each of said screen views presents respective information relating to one or more of the controllable features of said physical assets, and wherein each of said screen views presents an interactive control interface that includes one or more user interface tools permitting changing of the encoded instructions in said data store and changing of corresponding controllable features of the physical assets.

* * * * *